(12) United States Patent
Kim et al.

(10) Patent No.: US 12,045,395 B2
(45) Date of Patent: Jul. 23, 2024

(54) WEARABLE DEVICE AND METHOD FOR DETECTING MOTION GESTURE OF WEARABLE DEVICE

(71) Applicant: Samsung Electronics Co., Ltd., Suwon-si (KR)

(72) Inventors: Jinik Kim, Suwon-si (KR); Namjoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/333,950

(22) Filed: Jun. 13, 2023

(65) Prior Publication Data

US 2023/0325006 A1  Oct. 12, 2023

Related U.S. Application Data

(63) Continuation of application No. PCT/KR2021/015815, filed on Nov. 3, 2021.

(30) Foreign Application Priority Data

Dec. 17, 2020  (KR) .................. 10-2020-0177480

(51) Int. Cl.
*G06F 3/041*  (2006.01)
*G06F 3/01*  (2006.01)
*G06F 3/0354*  (2013.01)

(52) U.S. Cl.
CPC .............. *G06F 3/017* (2013.01); *G06F 3/013* (2013.01); *G06F 3/03547* (2013.01)

(58) Field of Classification Search
CPC ...... G06F 3/017; G06F 3/013; G06F 3/03547; G06F 3/011; G06F 3/015;

(Continued)

(56) References Cited

U.S. PATENT DOCUMENTS 9,495,575 B2  11/2016  Kim et al.
9,649,558 B2  5/2017  Stafford et al.
(Continued)

FOREIGN PATENT DOCUMENTS

CN  104765460 A  7/2015
CN  107678542 A  2/2018
(Continued)

OTHER PUBLICATIONS

International Search Report for PCT/KR2021/015815 mailed Feb. 7, 2022, 3 pages.

(Continued)

*Primary Examiner* — Temesghen Ghebretinsae
*Assistant Examiner* — Sosina Abebe
(74) *Attorney, Agent, or Firm* — Nixon & Vanderhye, P.C.

(57) ABSTRACT

Various embodiments of the present disclosure disclose a method and device, the device comprising: a touch sensor disposed adjacent to the outside of a housing and including touch interfaces for a plurality of areas; an inertial sensor having a set sensor axis; a biometric sensor disposed adjacent to the inside of the housing; a communication module comprising communication circuitry; a memory which maps and stores an angle corresponding to a touch detection range of each touch interface of the touch sensor; and a processor operatively connected to the touch sensor, the inertial sensor, the biometric sensor, the communication module, and the memory. The processor is configured to: detect whether a wearable device is worn using the biometric sensor and/or the inertial sensor; receive touch information from at least one of the plurality of touch interfaces included in the touch sensor; calibrate the sensor axis of the inertial sensor based on the touch information; obtain sensing information from (Continued)

the inertial sensor; and calculate position information from the sensing information based on the calibrated sensor axis.

16 Claims, 18 Drawing Sheets

(58) Field of Classification Search
CPC ......... G06F 2203/0381; G06F 3/04847; G06F 2203/0331; G06F 2203/0339; G06F 3/014; G06F 3/0346; G06F 3/038; G06F 2203/0384
See application file for complete search history.

(56) References Cited

U.S. PATENT DOCUMENTS

| | | | |
|---|---|---|---|
| 9,696,822 B2 | 7/2017 | Dow et al. | |
| 10,043,125 B2 | 8/2018 | Park | |
| 10,139,906 B1* | 11/2018 | Bai | G06F 3/014 |
| 10,281,953 B2 | 5/2019 | Von Badinski et al. | |
| 10,310,632 B2 | 6/2019 | Nirjon et al. | |
| 10,444,834 B2 | 10/2019 | Vescovi et al. | |
| 10,572,012 B2 | 2/2020 | Gupta et al. | |
| 10,635,391 B2 | 4/2020 | Shin et al. | |
| 2010/0219989 A1* | 9/2010 | Asami | G06F 3/014 341/20 |
| 2015/0277559 A1* | 10/2015 | Vescovi | G06F 3/017 345/173 |
| 2015/0338916 A1* | 11/2015 | Priyantha | G06F 1/1698 345/173 |
| 2016/0259905 A1 | 9/2016 | Park et al. | |
| 2016/0292563 A1* | 10/2016 | Park | G06F 3/016 |
| 2017/0075654 A1* | 3/2017 | Shin | H04R 1/1041 |
| 2018/0239429 A1* | 8/2018 | Gupta | G06F 3/0346 |
| 2019/0028134 A1 | 1/2019 | Barnett, Jr. | |
| 2019/0332140 A1* | 10/2019 | Wang | G06F 3/016 |
| 2020/0037904 A1* | 2/2020 | Tegen | A61B 5/746 |
| 2020/0351958 A1* | 11/2020 | Lee | H04W 76/15 |
| 2022/0383741 A1* | 12/2022 | Sanchez | G06F 3/016 |

FOREIGN PATENT DOCUMENTS

| | | | |
|---|---|---|---|
| CN | 109085885 A | 12/2018 | |
| KR | 20110040165 A | 4/2011 | |
| KR | 20170033025 A | 3/2017 | |
| KR | 20170043159 A | 4/2017 | |
| KR | 101933289 B1 | 12/2018 | |
| WO | WO-2016003365 A1 * | 1/2016 | G06F 1/16 |

OTHER PUBLICATIONS

Written Opinion of the ISA for PCT/KR2021/015815 mailed Feb. 7, 2022, 4 pages.

* cited by examiner (350)

(370)

[410]

(450)

[610]

[630]

(910)

(930)

WEARABLE DEVICE AND METHOD FOR DETECTING MOTION GESTURE OF WEARABLE DEVICE

CROSS-REFERENCE TO RELATED APPLICATIONS

This application is a continuation of International Application No. PCT/KR2021/015815 designating the United States, filed on Nov. 3, 2021, in the Korean Intellectual Property Receiving Office and claiming priority to Korean Patent Application No. 10-2020-0177480, filed on Dec. 17, 2020, in the Korean Intellectual Property Office, the disclosures of which are incorporated by reference herein in their entireties.

BACKGROUND

Field

The disclosure relates to a wearable device and a method for detecting a motion gesture by a wearable device.

Description of Related Art

In line with development of digital technologies, there has been widespread use of various types of electronic devices such as a mobile communication terminal, a personal digital assistant (PDA), an electronic diary, a smartphone, a tablet personal computer (PC), and a wearable device. The hardware-related parts and/or software-related parts of such electronic devices have been continuously improved to support and enhance the functionality of the electronic devices.

For example, an electronic device may use short-range wireless communication such as Bluetooth or Wi-Fi direct so as to connect to a laptop, a wearable earring (for example, an earphone or a headphone), a wearable display device (for example, AR glasses), or a head-mounted device (for example, a head-mounted display (HMD)), thereby outputting or exchanging information (or contents). For example, an electronic device may connect to a wearable earring and a wearable display device so as to output audios through the wearable earring and to output videos through the wearable display device. An electronic device may connect to multiple wearable devices and provide various functions such that the user can conveniently use the same.

A wearable device has an advantage in that a user can wear the same, but if the position in which the wearable device is worn on the user's body varies, sensor information detected by the wearable device may be inaccurate. If the sensor information is inaccurate, a wrong function may be performed, thereby inconveniencing the user. In addition, if multiple wearable devices are connected to an electronic device and used accordingly, the prior art provides no function for controlling the second wearable device using sensor information detected by the first wearable device.

SUMMARY

Embodiments of the disclosure may provide a method and a device wherein a touch sensor is used to detect a wearable device wearing position, and the sensor axis of an inertial sensor is corrected based on the wearing position such that more accurate posture information can be acquired using the inertial sensor, or an electronic device connected to the wearable device, or another wearable device connected to the electronic device can be controlled based on the acquired posture information.

A wearable device according to various example embodiments may include: a touch sensor disposed within a specified proximity to an outside of a housing, the touch sensor including multiple region-specific touch interfaces, an inertial sensor having a configured sensor axis, a biometric sensor disposed within a specified proximity to an inside of the housing, a communication module comprising communication circuitry, a memory configured to store angles mapped to correspond to touch detection ranges of respective touch interfaces of the touch sensor, and a processor operatively connected to the touch sensor, the inertial sensor, the biometric sensor, the communication module, and the memory, wherein the processor is configured to: detect whether the wearable device is worn using the biometric sensor and/or the inertial sensor, receive touch information from at least one of the multiple touch interfaces included in the touch sensor, correct the sensor axis of the inertial sensor based on the touch information, acquire sensing information from the inertial sensor, and calculate posture information from the sensing information based on the corrected sensor axis.

An electronic device according to various example embodiments may include a communication module comprising communication circuitry, a memory, and a processor operatively connected to the communication module and the memory, wherein the processor is configured to: connect to a first wearable device and a second wearable device through the communication module, acquire motion information from the first wearable device, determine a gesture command, based on the motion information, and control the second wearable device, based on the gesture command.

A method for operating a wearable device including a touch sensor including multiple region-specific touch interfaces, a biometric sensor, and an inertial sensor having a configured sensor axis according to various example embodiments may include: detecting whether the wearable device is worn using the biometric sensor and/or the inertial sensor, receiving touch information from at least one of the multiple touch interfaces included in the touch sensor, correcting the sensor axis of the inertial sensor based on the touch information, acquiring sensing information from the inertial sensor, and calculating posture information from the sensing information based on the corrected sensor axis.

According to various example embodiments, a touch sensor may be used to detect a wearable device wearing position, and the sensor axis of an inertial sensor may be corrected based on the wearing position such that more accurate posture information is acquired using the inertial sensor.

According to various example embodiments, even if the position in which a wearable device is worn on a user's body varies, various motion gesture services may be provided based on posture information measured by an inertial sensor.

According to various example embodiments, if the position in which a wearable device is worn on a user's body varies, a biometric sensor output value may be adjusted even if a region in which the biometric sensor is mounted moves away from the user's body, thereby acquiring more accurate biometric information.

According to various example embodiments, a multi-device service may be provided by controlling an electronic device connected to a wearable device or another wearable device connected to the electronic device, based on biometric information or posture information detected by the wearable device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
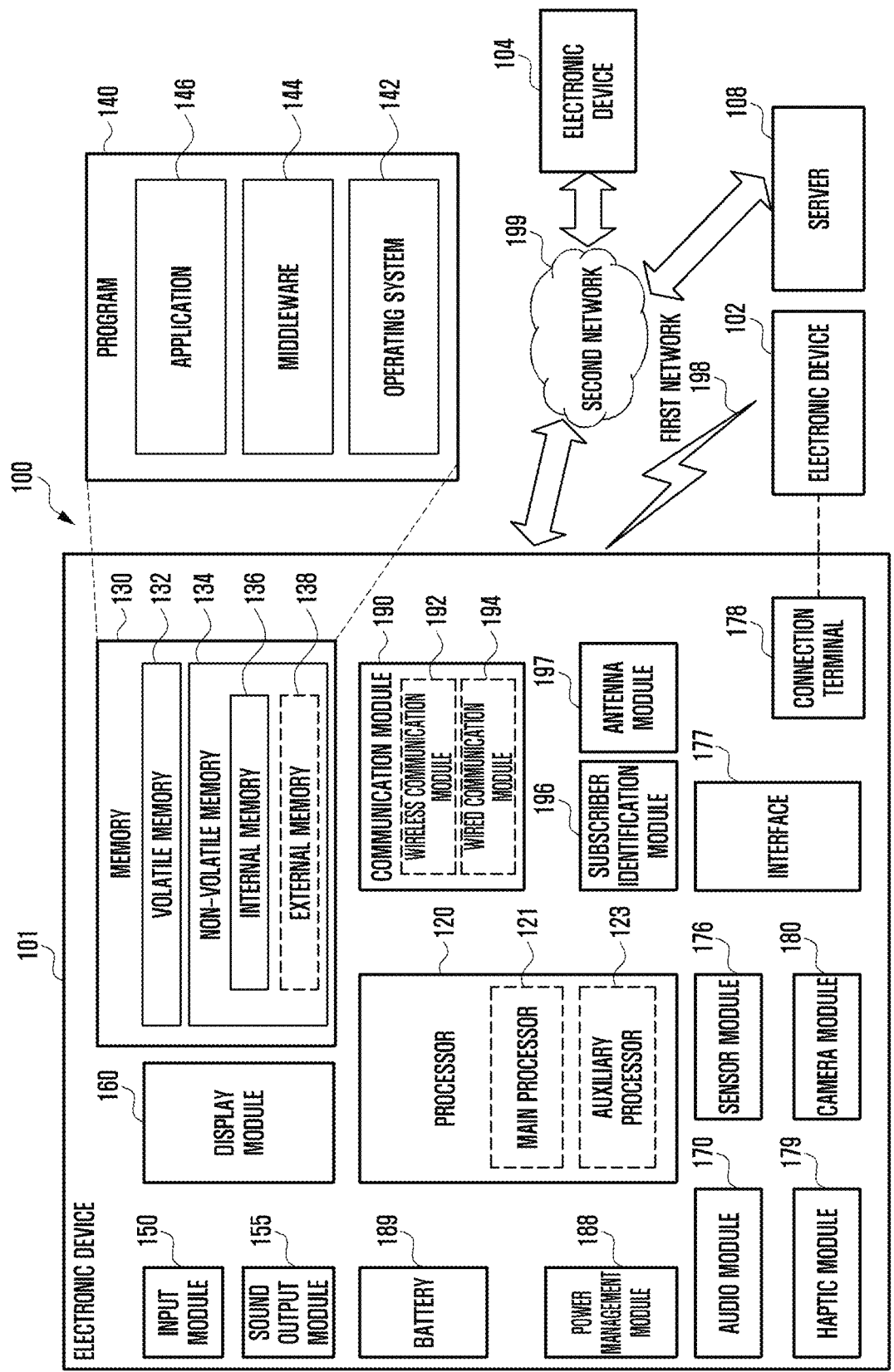
FIG. 1 is a block diagram illustrating an example electronic device inside a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
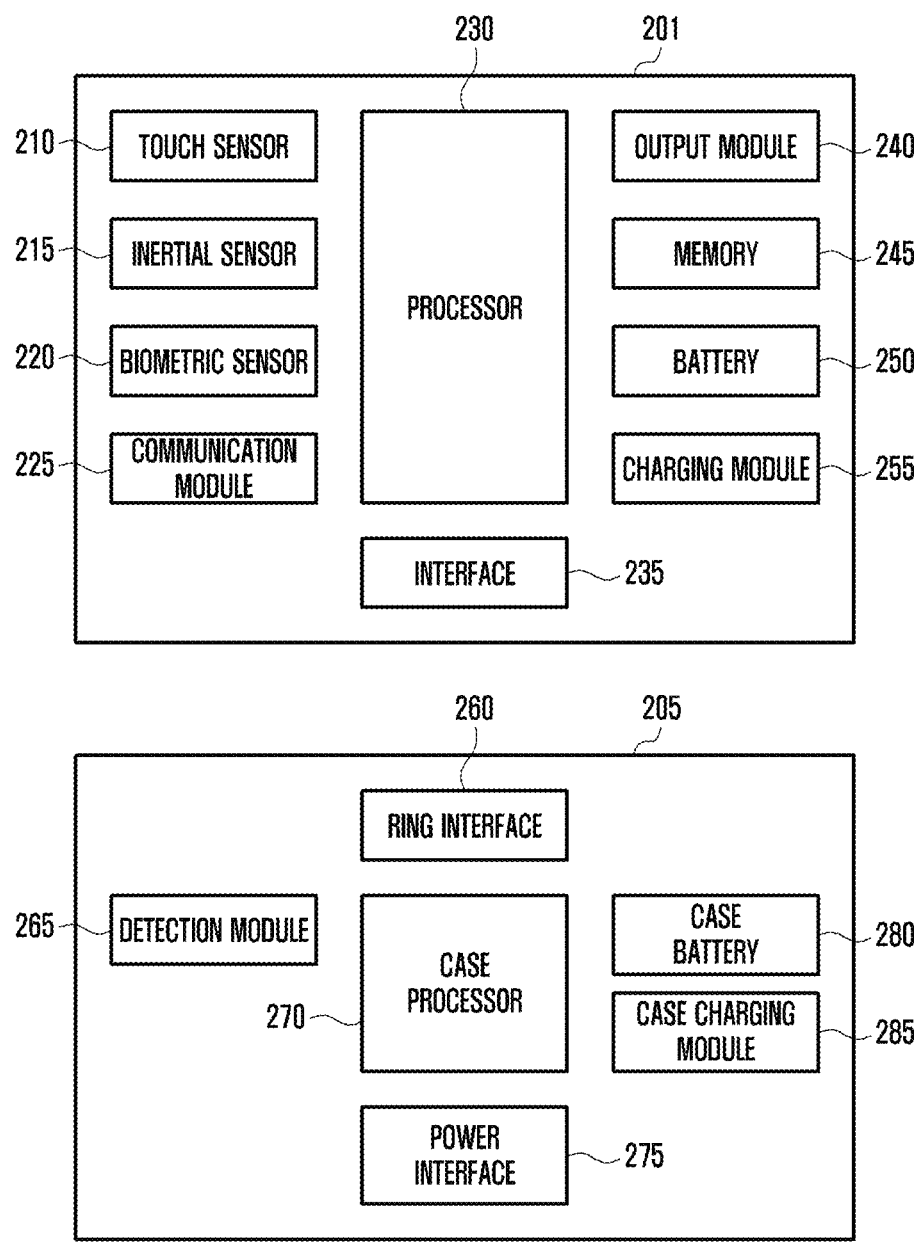
FIG. 2 is a block diagram illustrating an example configuration of a wearable device according to various embodiments.

FIG. 2 is a block diagram illustrating an example configuration of a wearable device according to various embodiments.

Referring to FIG. 2, the wearable device 201 according to various embodiments may include a touch sensor 210, an inertial sensor 215, a biometric sensor 220, a communication module (e.g., including communication circuitry) 225, a processor (e.g., including processing circuitry) 230, an interface (e.g., including interface circuitry) 235, an output module (e.g., including output circuitry) 240, a memory 245, a battery 250, and a charging module (e.g., including charging circuitry) 255. At least one (for example, the output module 240) of the above components of the wearable device 201 may be omitted, or one or more other components (for example, a proximity sensor) may be added thereto.

The touch sensor 210 may include a touch circuit configured to sense a touch (or a touch signal). The touch sensor 210 may be a capacitive touch sensor or a pressure-sensitive touch sensor. The touch sensor 210 may sense a single touch, a multi-touch, a surface touch, or a palm touch.

The inertial sensor 215 may be configured to measure the acceleration of a moving object or the intensity of an impact. The inertial sensor 215 may be an accelerometer or a gyroscope.

The biometric sensor 220 may contact a part of the user's body so as to acquire biometric information. For example, the biometric sensor 220 may include a photoplethysmogram (PPG) configured to obtain a blood pressure value. Alternatively, the biometric sensor 220 may include an electrode capable of measuring at least one of an electrocardiogram (ECG), a galvanic skin response (GSR), an electroencephalogram (EEG), a bioimpedance assessment (BIA), or a ballistocardiogram (BCG). In order to acquire biometric information, the biometric sensor 220 may include a light-emitting portion and a light-receiving portion, may output a signal through the light-emitting portion, and may acquire a signal reflected by the output signal through the light-receiving portion, thereby acquiring biometric information. Alternatively, the biometric sensor 220 may output a current through the electrode, and may acquire biometric information, based on a current received from the user's body in response to the output current.

The communication module 225 may include various communication circuitry and establish a wireless communication channel with the electronic device (for example, the electronic device 101 in FIG. 1) and may support communication performed through the established communication channel. The communication module 225 may be connected to the electronic device 101 through Bluetooth, Bluetooth Low Energy, Wi-Fi, ultra-wideband (UWB), adaptive network topology (ANT+), long term evolution (LTE), $5^{th}$ generation (5G) mobile telecommunication, or narrowband Internet of things (NB-IoT), or may be connected to an access point or a network. The communication module 225 may transmit sensing information (or a sensing signal) (for example, posture information, touch information, biometric information, or proximity information) to the electronic device 101. The communication module 225 may be identical or similar to the wireless communication module 192 in FIG. 1.

The processor 230 may include various processing circuitry and be configured to control operations of the wearable device 201. The processor 230 may control other components (for example, the touch sensor 210, the inertial sensor 215, the communication module 225, and the like) included in the wearable device 201, and may perform various kinds of data processing or computation. For example, based on sensing information acquired from the inertial sensor 215, the processor 230 may assess the state in which the wearable device 201 is worn, or the state of rotation thereof. The processor 230 may control the sensing information to be periodically transmitted to the electronic device 101 through the communication module 225. The processor 230 may include at least one of a main processor (for example, a micro controller unit), a sensor hub, a bio-processor, or a neural processor. The processor 230 may be identical or similar to the processor 120 in FIG. 1.

The interface 235 may include various circuitry and be physically connected to a wearable device case 205. For example, when the interface 235 is physically connected to a wearable device case 205, the battery 250 may be charged through the charging module 255. The charging module 255 may manage electric power supplied to the wearable device 201. The charging module 255 may charge the battery 250 with electric power received through the interface 235. The charging module 255 may be identical or similar to the power management module 188 in FIG. 1. The battery 250 may supply electric power to at least one component of the wearable device 201. The battery 250 may be identical or similar to the battery 189 in FIG. 1.

The output module 240 may include various output circuitry and provide information to the user. For example, the output module 240 may include at least one of a display (for example, the display module 160 in FIG. 1), an LED, a speaker (for example, the sound output device 155 in FIG. 1), and a haptic module (for example, the haptic module 179 in FIG. 1). The output module 240 may display notification information under the control of the processor 230, may turn on the LED, may blink the LED, may output a sound signal, or may output a vibration.

The memory 245 may store an angle mapped to correspond to a touch sensing range (or a touch region) of the touch sensor 210. When multiple touch sensors 210 are mounted on the wearable device 201, angles may be mapped to correspond to touch sensing ranges of respective touch sensors. In addition, the memory 245 may store sensing information. As the sensing information, sensing information acquired from the inertial sensor 215, or posture information calculated by the processor 230 based on the sensing information, may be stored. The sensing information may include biometric information acquired from the biometric sensor 220 and touch information acquired from the touch sensor 210. In addition, when the wearable device 201 includes a proximity sensor, the sensing information may include proximity information.

The wearable device case 205 may include a ring interface (e.g., including various circuitry) 260, a detection module (e.g., including detection circuitry) 265, a case processor (e.g., including processing circuitry) 270, a power interface (e.g., including power interface circuitry) 275, a case battery 280, and a case charging module (e.g., including case charging circuitry) 285.

The ring interface 260 may include various circuitry and be physically connected to the interface 235 of the wearable device 201. The detection module 265 may include various detection circuitry and detect whether the wearable device 201 is mounted (or contained) on the wearable device case 205. If the wearable device 201 is mounted on a containing portion of the wearable device case 205, the detection module 265 may transfer a corresponding signal to the case processor 270. The detection module 265 may include at least one sensor configured to detect whether the wearable device 201 is positioned on the wearable device case 205. For example, the detection module 265 may be a circuit configured to periodically "ping" contact portions (for example, the interface 235) that contact (or connect to) the wearable device 201. The detection module 265 may be a magnetic sensor, an optical sensor, a switch, a Hall effect sensor, a magnetic flux sensor, a capacitive sensor, a photodetector, a proximity detector, a momentary switch, a mechanical sensor, or an electric sensor. The case battery 280 may supply electric power to at least one component of the wearable device case 205. The case battery 280 may be identical or similar to the battery 189 in FIG. 1. The power interface 275 may include various power interface circuitry and be physically connected to an external power supply.

The case processor 270 may include various processing circuitry and be configured to control operations of the wearable device case 205. The case processor 270 may control other components (for example, the detection module 265, the charging module 285) included in the wearable device case 205, and may perform various kinds of data processing or computation. For example, if the wearable device 201 is connected, the case processor 270 may control the wearable device 201 to be charged.

The case charging module 285 may include various charging circuitry and manage electric power supplied to the wearable device 201 or to the wearable device case 205. The case charging module 285 may supply electric power to the wearable device 201. The case charging module 285 may charge the battery 280 with electric power received through the power interface 275. The case charging module 285 may be identical or similar to the power management module 188 in FIG. 1.

Figure 3A:
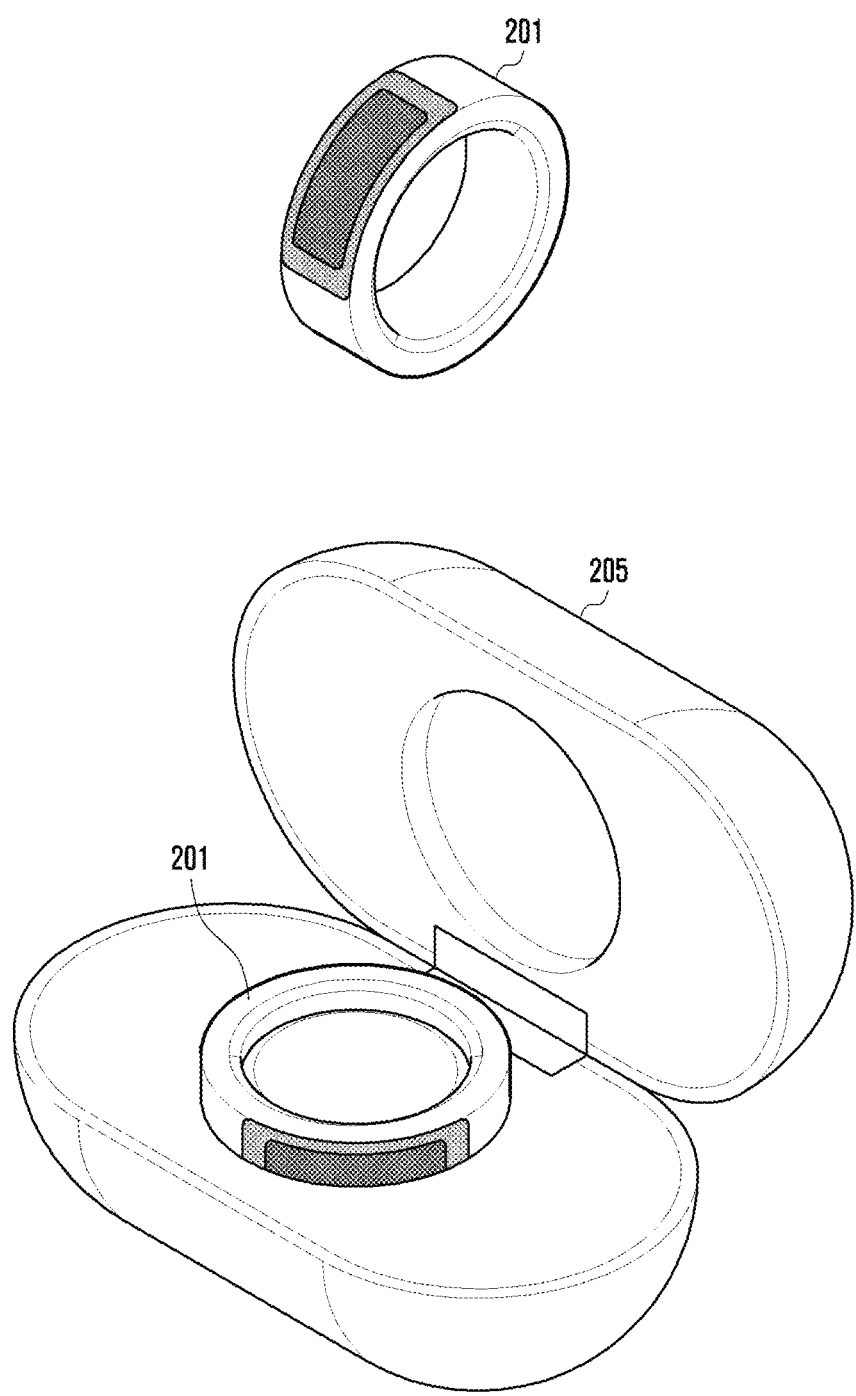
FIGS. 3A, 3B and 3C are diagrams including various views illustrating the configuration of a wearable device according to various embodiments.
Figure 3B:
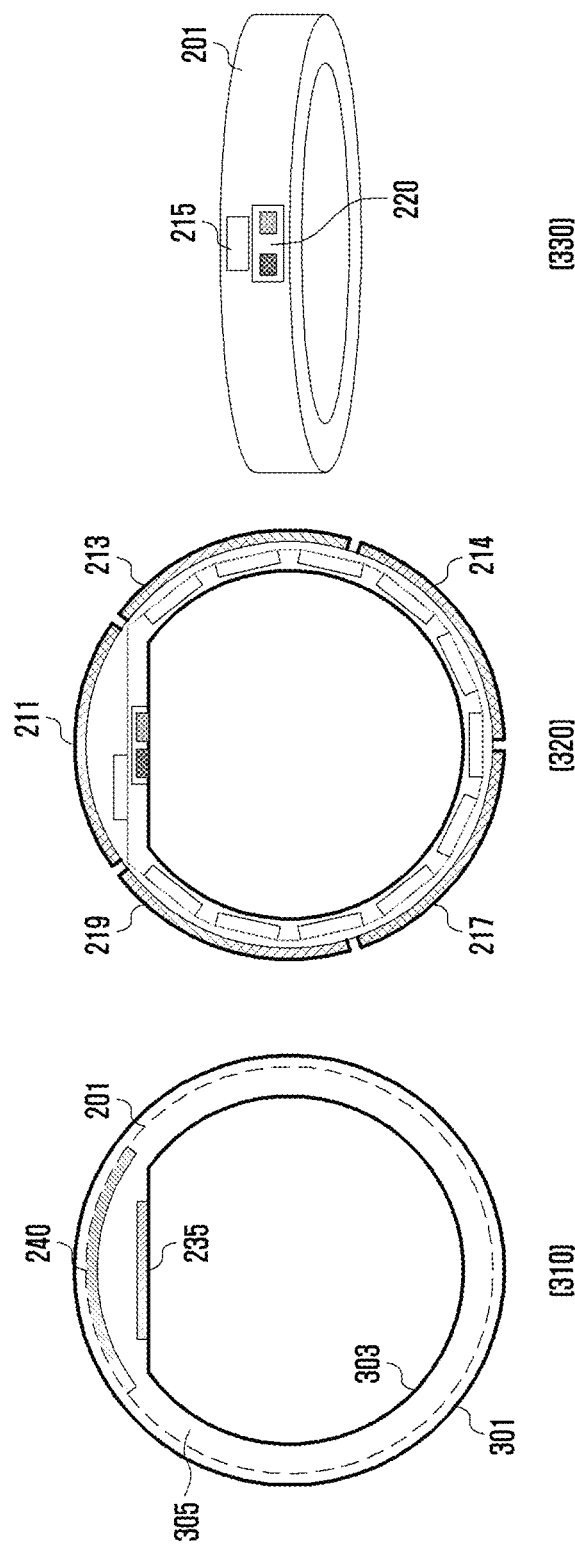
Figure 3C:
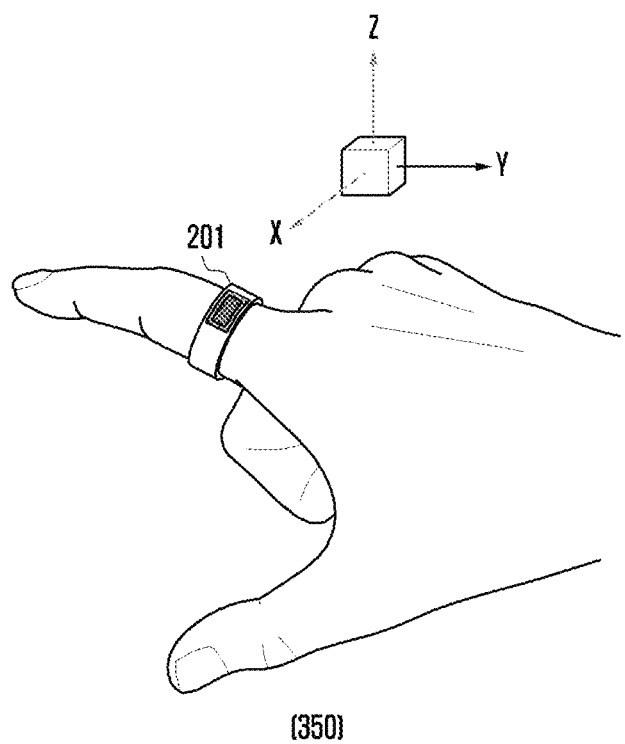
Figure 3C:
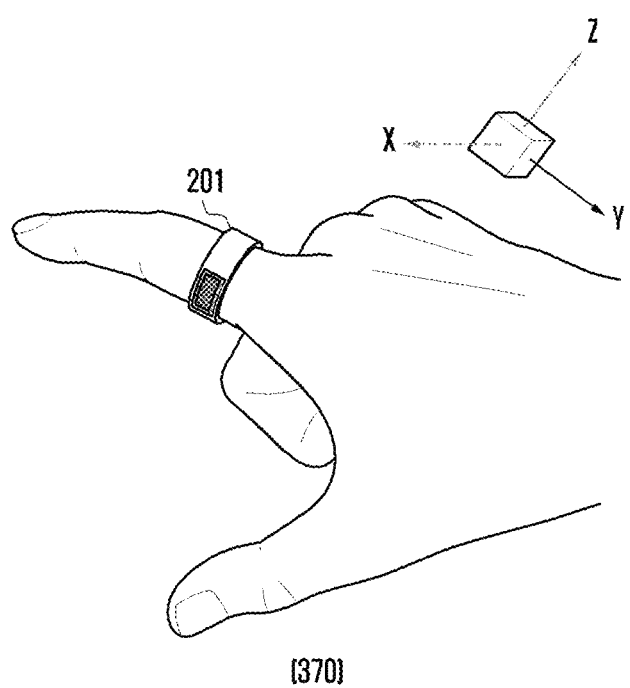

FIGS. 3A, 3B and 3C are diagrams including various views illustrating an example configuration of a wearable device according to various embodiments.

FIG. 3A is a perspective view illustrating a wearable device and a wearable device case according to various embodiments.

Referring to FIG. 3A, the wearable device (for example, the wearable device 201 in FIG. 2) according to various embodiments may be contained (or mounted) in the wearable device case (for example, the wearable device case 205 in FIG. 2). The wearable device 201 may be powered on upon being separated from the wearable device case 205. For example, if the wearable device 201 is powered on, the touch sensor 210, the inertial sensor 215, or the biometric sensor 220 may be driven. The wearable device 201 may be powered off or charged upon being mounted on the wearable device case 205.

The wearable device case 205 may include a housing having a containing portion (or a space portion) configured to contain (or store) the wearable device 201, and a cover attached to the housing. The containing portion may be configured to magnetically pull the wearable device 201 into the case 250 and to maintain the same therein. If the wearable device 201 is mounted in the containing portion, or if the cover is closed, the wearable device case 205 may control the wearable device 201 to be powered off or to be charged.

FIG. 3B is a lateral view of a wearable device according to various embodiments.

Referring to FIG. 3B, the wearable device 201 may be formed in a circular shape as in the first lateral view 310. Although the drawing shows an example in which the wearable device 201 is formed in a ring-type circular shape, the wearable device 201 may be formed in various shapes such as a quadrangle, a polygon, and the like. For example, when the wearable device 201 is formed in a ring type, the inner perimeter of the housing may be formed in a circular shape such that the user can comfortably wear the same, but the outer perimeter of the housing may be formed in various shapes such as a quadrangle, a polygon, and the like. Referring to the first lateral view 310, the wearable device 201 may include a housing 305 and may include an output module (for example, the output module 240 in FIG. 2) and an interface 235 inside the housing 305. The output module 240 may be disposed closer to the outer perimeter 301 of the housing 305 than to the inner perimeter 303 thereof, and the interface 235 may be disposed closer to the inner perimeter 303 than to the outer perimeter 301. Although the interface 235 is illustrated in the drawing as being disposed close to the circular inner perimeter 303, the interface 235 may be disposed close to the circular outer perimeter 301. This is only a manner of implementation, and the disclosure is not limited thereto.

The inner perimeter 303 of the housing 305 may refer to a surface (for example, inside) abutting a finger of the user on which the ring-type wearable device 201 is worn. The outer perimeter 301 of the housing 305 may refer to a surface (for example, outside) not abutting a finger of the user on which the ring-type wearable device 201 is worn. The outer perimeter 301 may correspond to a circular large circumference, and the inner perimeter 303 may have a circular small circumference.

Referring to the second lateral view 320, a touch sensor 210 may be disposed inside the housing 305. The touch sensor 210 may include multiple region-specific touch interfaces divided in the circumferential direction along at least one lateral surface of the outer perimeter 301. For example, touch interfaces made of a metal material may be separately disposed on an inside close to the outer perimeter 301 of the housing 305, respectively. The multiple touch interfaces corresponding to multiple regions may be connected to an inner touch circuit so as to estimate a capacitance value using an inner voltage output value, thereby assessing a touch. The inner voltage output value may be transferred to a processor (for example, the processor 230 in FIG. 2) through an ADC, thereby assessing whether a touch occurs with regard to each touch interface, or assessing the degree of a touch. For example, the multiple touch interfaces may include a first touch interface 211, a second touch interface 213, a third touch interface 214, a fourth touch interface 217, and a fifth touch interface 219. Respective touch interfaces may be disposed at a predetermined interval in the circumferential direction along at least one lateral surface of the outer perimeter 301 of the housing 305, and touch sensing ranges (or touch regions) may be determined accordingly. If the wearable device 201 has a circular shape, the touch sensing range of the wearable device 201 may be 360°, and the touch sensing range of each touch sensor may be determined between 65°-75° (about 72°).

According to various embodiments, the memory (for example, the memory 245 in FIG. 2) of the wearable device 201 may store angles mapped to correspond to touch sensing ranges of respective touch interfaces of a touch sensor. Although it is assumed in the description that angles are stored in the memory 245 to help understanding of the disclosure, information stored in the memory 245 may be raw data and may be utilized as meaningful information through processing by the processor 230. Touch sensing ranges of respective touch interfaces may overlap partially (for example, 5°), or touch interfaces may be disposed such that touch sensing ranges do not overlap each other. For example, the first touch interface 211 may have an angle of 324°-36° corresponding to the touch sensing range thereof, the second touch interface 213 may have an angle of 36°-108° corresponding to the touch sensing range thereof, the third touch interface 214 may have an angle of 108°-180° corresponding to the touch sensing range thereof, the fourth touch interface 217 may have an angle of 180°-252° corresponding to the touch sensing range thereof, and the fifth touch interface 219 may have an angle of 252°-324° corresponding to the touch sensing range thereof. This is only an example for helping understanding of the disclosure, and the disclosure is not limited by the example.

Referring to the third lateral view 330, an inertial sensor (for example, the inertial sensor 215) may be disposed inside the housing 305, and a biometric sensor (for example, the biometric sensor 220) may be disposed close to the inner perimeter 303 of the housing 305. The biometric sensor 220 needs to contact a part of the user's body in order to acquire biometric information, and thus may be disposed close to the inner perimeter 303 that abuts the wearing user's finger. Although the biometric sensor 220 is illustrated in the drawing as being disposed close to the first touch interface 211 (for example, on an inside opposite to the output module 240), the biometric sensor 220 may be disposed on the inner perimeter 303 of the housing 305 so as to be close to the third touch interface 214 or the fourth touch interface 217.

FIG. 3C is a diagram illustrating an example in which the axis of an inertial sensor is changed based on a wearing reference angle in connection with a wearable device according to various embodiments.

Referring to FIG. 3C, the first wearing state 350 may refer to a state in which, when the user wears the wearable device 201 on the user's finger, the output module 240 is disposed near the back of the user's hand and is positioned in the middle of the finger near the back of the hand. With reference to the first wearing state 350, the wearable device 201 may have a touch sensor 210, an inertial sensor 215, or a biometric sensor 220 disposed thereon. The wearable device 201 may provide a guide through the output module 240 such that the user can wear the same as in the first wearing state 350. For example, the wearable device 201 may output wearing guide information as a text, an image, or an audio. The wearable device 201 may sense whether the same is worn, based on at least one of the touch sensor 210, the inertial sensor 215, or the biometric sensor 220.

According to various embodiments, if wearing is sensed, the wearable device 201 may acquire touch information from the touch sensor 210 and may determine a wearing reference angle, based on the touch information. After being worn by the user, the wearable device 201 may be rotated (for example, rotated around the user's finger). If the user's wearing state is deemed, based on the touch information, to be a first wearing state 350, the wearable device 201 may maintain the wearing reference angle at an angle configured in the memory (for example, the memory 245 in FIG. 2). For example, the wearable device 201 may map touch sensing ranges of respective touch sensors to corresponding angles with reference to the first wearing state 350 and may store the same in the memory 245.

If the user's wearing state is deemed, based on the touch information, to be a second wearing state 370, the wearable device 201 may change the wearing reference angle. For example, if the wearing reference angle has been determined in the first wearing state 350 with reference to the position in which the first touch interface 211 is disposed, the wearing reference angle may be determined with reference to the second touch interface 213 in the second wearing state 370. The wearable device 201 may correct the sensor axis of the inertial sensor 215, based on the wearing reference angle. For example, the sensor axis of the inertial sensor 215 may have been configured with reference to the first wearing state 350. The sensor axis of the inertial sensor 215 may need no correction in the first wearing state 350, and the sensor axis of the inertial sensor 215 may need correction in the second wearing state 370. The sensor axis of the inertial sensor 215 may be corrected by correcting the angle of the sensor axis, based on the amount of rotation from an angle stored in the memory 245. The sensor axis correction may be for the purpose of improving the accuracy of sensing information from the inertial sensor 215.

According to various embodiments, in the second wearing state 370, signals (or currents) output by the biometric sensor 220 may be increased to acquire more accurate biometric information. The biometric sensor 220 may acquire accurate biometric information when contacting a specific part of the user's body (for example, the inside of a finger). Somewhat inaccurate biometric information may be acquired if the biometric sensor 220 does not contact any specific part. Signals (or currents) output by the biometric sensor 220 may be determined with reference to the first wearing state 350. The wearable device 201 may adjust signals (or currents) output by the biometric sensor 220, based on the user's wearing state, when the same is not deemed to be the first wearing state 350.

Figure 4A:
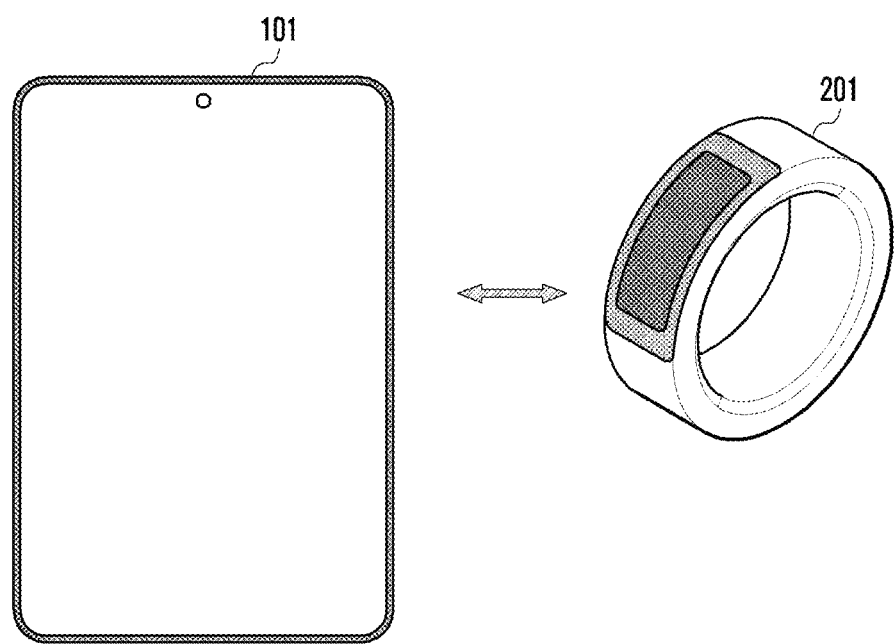
FIGS. 4A and 4B are diagrams illustrating an example in which at least one wearable device is connected to electronic device according to various embodiments.
Figure 4B:
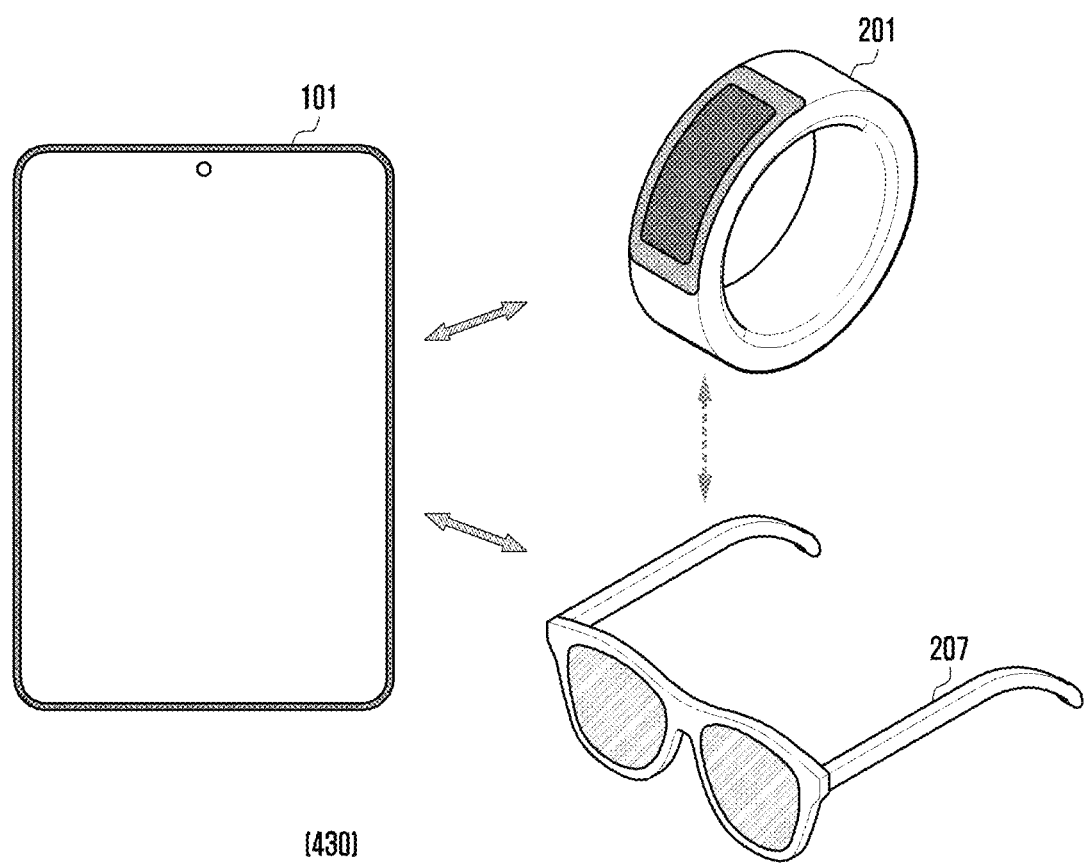

FIGS. 4A and 4B are diagrams illustrating examples in which at least one wearable device is connected to electronic device according to various embodiments.

FIG. 4A illustrates an example in which an electronic device and a wearable device are connected according to various embodiments.

Referring to FIG. 4A, in the first network environment 410, an electronic device according to various embodiments (for example, the electronic device 101 in FIG. 1) may be paired (or connected) with a wearable device (for example, the wearable device 201 in FIG. 2) through short-range wireless communication (for example, Bluetooth). Pairing may refer to a state in which a discovery process and a mutual authentication process between the electronic device 101 and the wearable device 201 are completed. The pairing operation corresponds to the prior art, and detailed descriptions may be omitted herein. If connected to the wearable device 201, the electronic device 101 may display wearable device 201 wearing guide information through a display (for example, the display module 160 in FIG. 1). The wearable device 201, if sensed as being worn on the user's body, may transmit sensing information sensed by each sensor to the electronic device 101 periodically, in real time, or selectively.

For example, the sensing information may include touch information acquired by the touch sensor 210, sensing information acquired by the inertial sensor 215 or posture information calculated based on the sensing information, or biometric information acquired by the biometric sensor 220. The electronic device 101 may assess the user's state, based on the sensing information of the wearable device 201, or may utilize the same as auxiliary information for controlling functions of the electronic device 101. The user's state may include at least one of sleep, exercise, work, rest, heartrate, or blood pressure state. If a configured application (for example, a health application) is executed, the electronic device 101 may provide the user's state information (for example, eight-hour speed, the quality of sleep, exercise time, working time, rest time). The electronic device 101 may use the sensing information so as to control the brightness of the electronic device 101, sounds, and scree zoom-in/out. Based on the touch information, the electronic device 101 may correct sensing information acquired by the inertial sensor 215, thereby calculating posture information, or may receive calculated posture information from the wearable device 201.

FIG. 4B illustrates an example in which an electronic device and at least two wearable devices are connected according to various embodiments.

Referring to FIG. 4B, the second network environment 430 may refer to an environment in which multiple wearable devices are connected to an electronic device 101. The electronic device 101 may be paired (or connected) with a wearable device 201 and another wearable device 207 through short-range communication. The other wearable device 207 is configured to output video data, and may include, for example, a wearable glass device (for example, AR glasses), smart glasses) or a head-mounted device (for example, a head-mounted display (HMD)). Since two wearable devices exist in FIG. 4B, a wearable device 201 may be identified as a first wearable device 201, and another wearable device 207 may be identified as a second wearable device 207. This is for the purpose of easily identifying two wearable devices, and does not limit the disclosure.

According to various embodiments, the electronic device 101 may be connected to the first wearable device 201 and to the second wearable device 207 in different communication types. For example, the electronic device 101 may be connected to the first wearable device 201 through Bluetooth, and to the second wearable device 207 through Wi-Fi Direct. The second wearable device 207 may provide (for example, transmit) at least one piece of information such as image information, device information, sensing information, function information, and/or position information to the electronic device 101 upon being connected to the electronic device 101. Based on the image information, device information, sensing information, function information, and/or position information transmitted by the second wearable device 207, the electronic device 101 may generate data (for example, an AR image) related to image data and may transmit the same to the second wearable device 207.

The electronic device 101 may control the second wearable device 207, based on sensing information of the first wearable device 201. For example, upon detecting a gesture of the user who wears the first wearable device 201 on his/her finger made by holding and rotating the first wearable device 201 with two fingers, the electronic device 101 may control the second wearable device 207 to display a user interface related to volume control, based on the gesture.

Figure 4C:
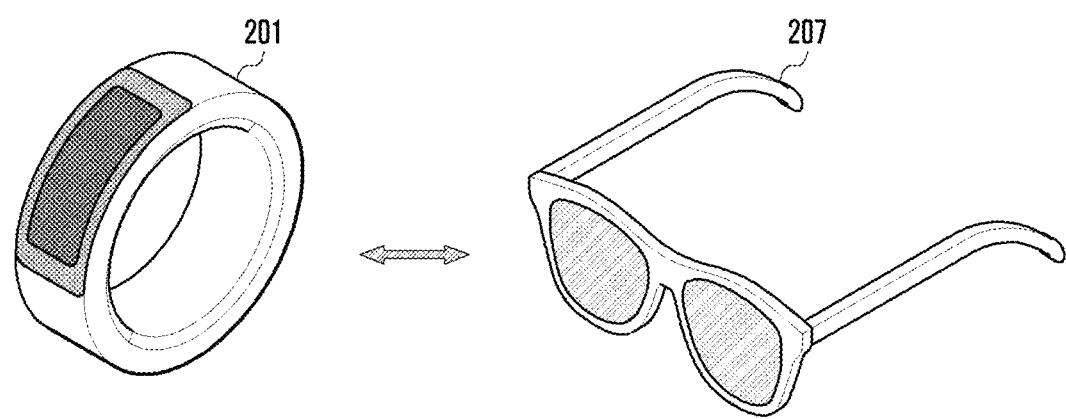
FIG. 4C is a diagram illustrating an example in which at least two wearable devices are connected according to various embodiments.

FIG. 4C is a diagram illustrating an example in which at least two wearable devices are connected according to various embodiments.

Referring to FIG. 4C, the third network environment 450 may refer to an environment in which a first wearable device 201 and a second wearable device 207 are connected. The first wearable device 201 and the second wearable device 207 may be connected through short-range communication (for example, Bluetooth, Wi-Fi Direct, UWB). If first wearable device 201 and the second wearable device 207 are connected, the second wearable device 207 may be controlled based on sensing information of the first wearable device 201.

For example, the second wearable device 207 may track the user's gaze, and may scan an object, based on the user's gaze. The second wearable device 207 may scan the first wearable device 201 as the object. The user who wears the first wearable device 201 on his/her finger may make a gesture by holding and rotating the first wearable device 201 with two fingers. The second wearable device 207 may acquire sensing information from the first wearable device 201 and, if the sensing information corresponds to a configured volume control gesture, may display a user interfaced related to volume control through a display. Alternatively, if the first wearable device 201 is included in the user's gaze, the second wearable device 207 may display the user interface related to volume control, based on the position of the first wearable device 201 included in the user's gaze. For example, the second wearable device 207 may display the user interface related to volume control so as to be close to the first wearable device 201 included in the user's gaze.

A wearable device according to various example embodiments (for example, the wearable device 201 in FIG. 2) may include: a touch sensor (for example, the touch sensor 210 in FIG. 2) disposed within a specified proximity to an outside (for example, the outer perimeter 301 in FIG. 3B) of a housing (for example, the housing 305 in FIG. 3B), and including multiple region-specific touch interfaces (for example, the first touch interface 211 to the fifth touch interface 219 in FIG. 3B), an inertial sensor (for example, the inertial sensor 215 in FIG. 2) having a configured sensor axis, a biometric sensor (for example, the biometric sensor 220 in FIG. 2) disposed within a specified proximity to an inside of the housing, a communication module comprising communication circuitry (for example, the communication sensor 225 in FIG. 2), a memory (for example, the memory 245 in FIG. 2) configured to store angles mapped to correspond to touch detection ranges of respective touch interfaces of the touch sensor, and a processor (for example, the processor 230 in FIG. 2) operatively connected to the touch sensor, the inertial sensor, the biometric sensor, the communication module, and the memory. The processor may be configured to: detect whether the wearable device is worn using the biometric sensor and/or the inertial sensor, receive touch information from at least one of the multiple touch interfaces included in the touch sensor, correct the sensor axis of the inertial sensor based on the touch information, acquire sensing information from the inertial sensor, and calculate posture information from the sensing information based on the corrected sensor axis.

The processor may determine that the wearable device is worn based on biometric information being acquired from the biometric sensor, or a movement being detected from the inertial sensor.

The processor may be configured to determine a wearing reference angle, based on the touch information, and correct the sensor axis of the inertial sensor based on the wearing reference angle.

The processor may be configured to determine the wearing reference angle as an angle stored in the memory based on the wearable device wearing state being a first wearing state based on the touch information, and change the wearing reference angle based on the wearable device wearing state being a second wearing state based on the touch information.

Multiple touch interfaces included in the touch sensor may be disposed such that touch detection ranges of respective touch interfaces do not overlap.

The wearable device may be formed in a ring type, and the multiple touch interfaces may be disposed in a circumferential direction along at least one lateral surface of a ring-type housing outer perimeter.

The biometric sensor may be formed on a ring-type housing inner perimeter to contact a user's body and to acquire biometric information based on the wearable device being worn, and the multiple touch interfaces may be formed on a ring-type housing outer perimeter and configured to acquire the user's wearing state based on the wearable device being worn.

The processor may be configured to determine a motion gesture, based on at least one of touch information acquired by each of the touch interfaces, sensing information acquired by the inertial sensor, or biometric information acquired by the biometric sensor.

The processor may be configured to connect to an electronic device through the communication module, and control the communication module to transmit the touch information or the posture information to the electronic device such that a function of the electronic device is executed based on the touch information or the posture information.

The processor may be configured to assess a user's intent, based on touch information acquired by each of the touch interfaces before rotation detection.

An electronic device according to various example embodiments (for example, the electronic device 101 in FIG. 1) may include: a communication module comprising communication circuitry (for example, the communication module 190 in FIG. 1), a memory (for example, the memory 130 in FIG. 1), and a processor (for example, the processor 120 in FIG. 1) operatively connected to the communication module and the memory. The processor may be configured to: connect to a first wearable device and a second wearable device through the communication module, acquire motion information (for example, posture information) from the first wearable device, determine a gesture command based on the motion information, and control the second wearable device based on the gesture command.

The processor may be configured to determine a gesture command, based on a rotational direction or a rotational velocity included in the motion information, and control the communication module to transmit the gesture command to the second wearable device such that the second wearable device is controlled.

The processor may be configured to control a user interface corresponding to the motion gesture to be displayed based on a gaze of a user detected by the second wearable device.

The processor may be further configured to: connect to a third wearable device through the communication module, acquire the motion information from the first wearable device and the third wearable device, determine the gesture command based on the motion information, and control the second wearable device based on the gesture command.

Figure 5:
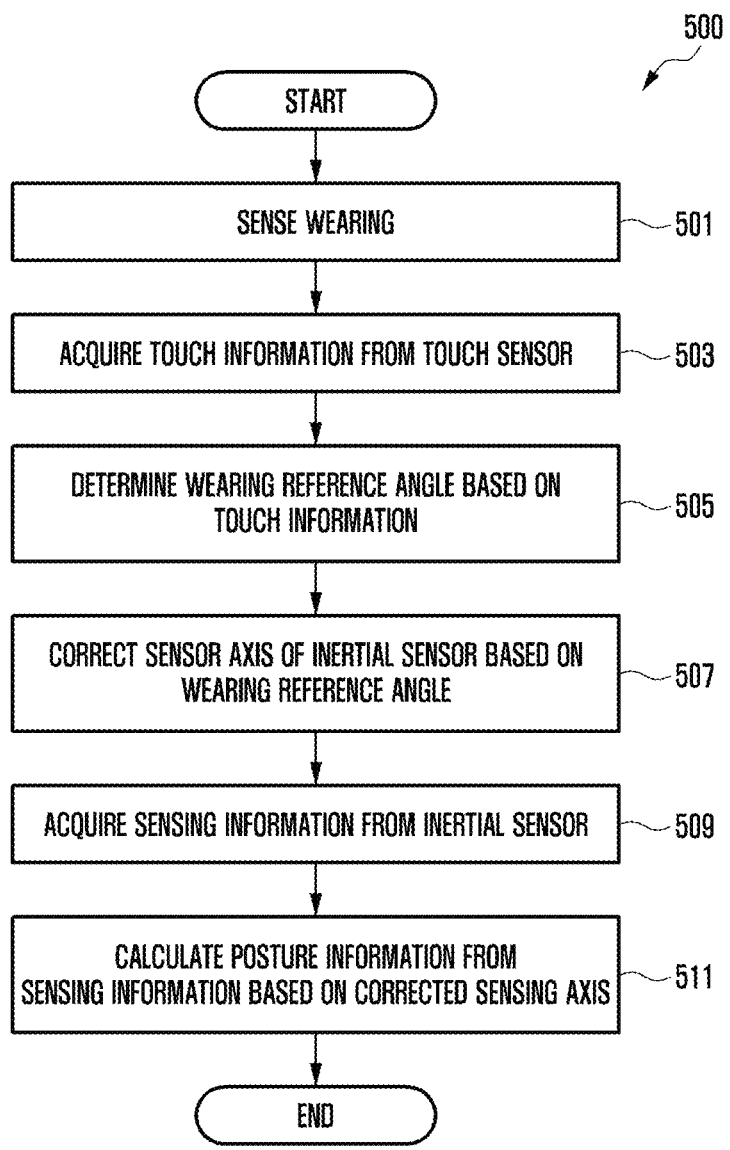
FIG. 5 is a flowchart illustrating an example method for operating a wearable device according to various embodiments.

FIG. 5 is a flowchart 500 illustrating an example method for operating a wearable device according to various embodiments.

Referring to FIG. 5, in operation 501, the processor (for example, the processor 230 in FIG. 2) of a wearable device according to various embodiments (for example, the wearable device 201 in FIG. 2) may sense wearing. Sensing of wearing may corresponds to whether the wearable device 201 is worn on a user's body. For example, the wearable device 201, if formed in a ring type, may be worn on the user's finger. The processor 120 may sense whether the wearable device 201 is worn, using at least one of a touch sensor (for example, the touch sensor 210 in FIG. 2), an inertial sensor (for example, the inertial sensor 215 in FIG. 2), or a biometric sensor (for example, the biometric sensor 220 in FIG. 2). The processor 120 may determine that the wearable device 201 is worn if sensing information acquired from the inertial sensor 215 has a change after a touch is sensed by the touch sensor 210. Alternatively, the processor 120 may determine that the wearable device 201 is worn if sensing information acquired from the inertial sensor 215 has a change, and if biometric information is acquired by the biometric sensor 220, after a touch is sensed by the touch sensor 210. Alternatively, when the wearable device 201 further includes a proximity sensor, the processor 230 may determine that the wearable device 201 is worn if sensing information is detected by the proximity sensor.

In operation 503, the processor 230 may acquire touch information from the touch sensor 210. The touch sensor 210 may be disposed on the outer perimeter (for example, the outer perimeter 301 in FIG. 3B) of the housing (for example, the housing 305 in FIG. 3B) of the wearable device 201. The touch sensor 210 may include multiple region-specific touch interfaces. The processor 230 may acquire touch information from at least one of the multiple touch interfaces. For example, the processor 230 may acquire touch information from the second touch interface (for example, the second touch interface 213 in FIG. 3B) and the fifth touch interface (for example, the fifth touch interface 219 in FIG. 3B). Alternatively, the processor 230 may acquire touch information from the first touch interface (for example, the first touch interface 211 in FIG. 3B) and the fourth touch interface (for example, the fourth touch interface 217 in FIG. 3B). If the wearable device 201 is worn, the processor 230 may acquire touch information from at least two different touch interfaces, respectively, among the multiple touch sensors.

According to various embodiments, when the touch interfaces are separately formed with regard to respective regions, the touch information may include whether a touch is detected (for example, detected (O), not detected (X)). The processor 230 may acquire touch information from a touch interface that has detected a touch, and may not acquire touch information from a touch interface that has detected no touch. Alternatively, when the touch interfaces are not separately formed with regard to respective regions, the touch information may include whether a touch is detected (for example, detected (O), not detected (X)) and positions of detection (for example, x, y coordinates). The processor 230 may acquire whether a touch is detected and positions of detection through the touch information.

In operation 505, the processor 230 may determine a wearing reference angle, based on touch information. The wearing reference angle may vary depending on the state in which the user wears the wearable device 201. The memory (for example, the memory 245 in FIG. 2) of the wearable device 201 may store angles mapped to correspond to touch sensing ranges of respective touch sensors. For example, the first touch interface 211 may have an angle of 324°-36° corresponding to the touch sensing range thereof, the second touch interface 213 may have an angle of 36°-108° corresponding to the touch sensing range thereof, the third touch interface 214 may have an angle of 108°-180° corresponding to the touch sensing range thereof, the fourth touch interface 217 may have an angle of 180°-252° corresponding to the touch sensing range thereof, and the fifth touch interface 219 may have an angle of 252°-324° corresponding to the touch sensing range thereof.

The memory 245 may have angles mapped to correspond to touch sensing ranges of respective touch sensors with reference to disposition of the first touch interface 211 on a finger part (for example, on the outside of a finger) corresponding to the back of the user's hand. Characteristics of the wearable device 201 enable the same to rotate when worn, and the state in which the user wears the same may vary depending on the state of rotation. For example, when the state in which the wearable device 201 is worn is a first wearing state 350, the processor 120 may determine that the wearing reference angle is an angle stored in the memory 245. Alternatively, when the state in which the wearable device 201 is worn is a second wearing state 370, the processor 120 may change the wearing reference angle. An example in which the wearing reference angle is changed will be described later in detail with reference to FIG. 6.

In operation 507, the processor 230 may correct the sensor axis of the inertial sensor 215, based on the wearing reference angle. The inertial sensor 215 may have a sensor axis configured by default, and the sensor axis of the inertial sensor 215 may be configured with reference to the first touch interface 211, for example, and stored in the memory 245. The sensor axis of the inertial sensor 215 may be corrected by correcting the angle of the sensor axis, based on the amount of rotation from an angle stored in the memory 245. For example, the angle of the sensor axis caused by a rotation may be corrected in the following manner a rotation matrix is configured so as to correspond to a rotation generated by the user's rotation, or a wearing reference point of the inertial sensor 215, and the current angular axis of the inertial sensor 215 is rotated so as to correct sensing information generated by the rotation. The processor 230 may correct the axis of the inertial sensor 215 by applying an acceleration value measured by the accelerometer to a rotation matrix as in Equation 1 below:

$$R_x(\theta) = \begin{bmatrix} 1 & 0 & 0 \\ 0 & \cos\theta & -\sin\theta \\ 0 & \sin\theta & \cos\theta \end{bmatrix}$$ [Equation 1]

$$R_y(\theta) = \begin{bmatrix} \cos\theta & 0 & \sin\theta \\ 0 & 1 & 0 \\ -\sin\theta & 0 & \cos\theta \end{bmatrix}$$

$$R_z(\theta) = \begin{bmatrix} \cos\theta & -\sin\theta & 0 \\ \sin\theta & \cos\theta & 0 \\ 0 & 0 & 1 \end{bmatrix}$$

wherein $R_x(\theta)$ may refer to the x-axis rotation angle, $R_y(\theta)$ may refer to the y-axis rotation angle, and $R_z(\theta)$ may refer to the z-axis rotation angle. For example, if the determined wearing reference angle is rotated from an angle stored in the memory 245 by 30°, the processor 230 may correct the sensor axis of the inertial sensor 215 to be rotated by 30°.

In operation 509, the processor 230 may acquire sensing information from the inertial sensor 215. The sensing information may be an acceleration value measured by the accelerometer. Alternatively, the sensing information may be an angular velocity value measured by the gyro sensor. The processor 230 may acquire sensing information for a designated time (for example, five seconds).

In operation 511, the processor 230 may calculate posture information from sensing information, based on the corrected sensing axis. Accelerations (fx, fy, fz) measured by the accelerometer may include the gravitational acceleration and various kinds of acceleration occurring when the magnitude and direction of velocities change. The processor 230 may calculate posture information by applying the sensing information to Equation 2 below:

$$\begin{bmatrix} f_x \\ f_y \\ f_z \end{bmatrix} = \begin{bmatrix} v_x \\ v_y \\ v_z \end{bmatrix} + \begin{bmatrix} 0 & v_z & -v_y \\ -v_z & 0 & v_x \\ v_y & -v_x & 0 \end{bmatrix} \begin{bmatrix} \omega_x \\ \omega_y \\ \omega_z \end{bmatrix} + g \begin{bmatrix} \sin\theta \\ -\cos\theta\sin\phi \\ -\cos\theta\cos\phi \end{bmatrix}$$ [Equation 2]

wherein, vx, vy, and vz may refer to movement velocities; ωx, ωy, and ωz may refer to rotational angular velocities; g may refer to the gravitational acceleration; φ may refer to a pitch value; and θ may refer to a roll value.

if the electronic device 101 is stationary or is moving at a constant velocity, Equation 2 may be abbreviated to Equation 3 below:

$$\begin{bmatrix} f_x \\ f_y \\ f_z \end{bmatrix} = g \begin{bmatrix} \sin\theta \\ -\cos\theta\sin\phi \\ -\cos\theta\cos\phi \end{bmatrix} \quad \text{[Equation 3]}$$

The processor 230 may calculate a pitch value and a role value, respectively, corresponding to posture information, from Equation 3.

$$\theta = \sin^{-1}\left(\frac{f_x}{g}\right) \quad \text{[Equation 4]}$$

$$\varphi = \sin^{-1}\left(\frac{-f_y}{g\cos\theta}\right)$$

In Equation 4, φ may refer to a pitch value, and θ may refer to a roll value.

According to various embodiments, when the inertial sensor 215 includes an accelerometer and a gyro sensor, the processor 120 may measure the amount of change in angular velocity of an angular axis measured by the gyro sensor, thereby measuring the amount of change in posture value while the wearable device 201 rotates. The processor 120 may calculate a yaw value by measuring the amount of change in angular velocity of an angular axis measured by the gyro sensor.

Figure 6:
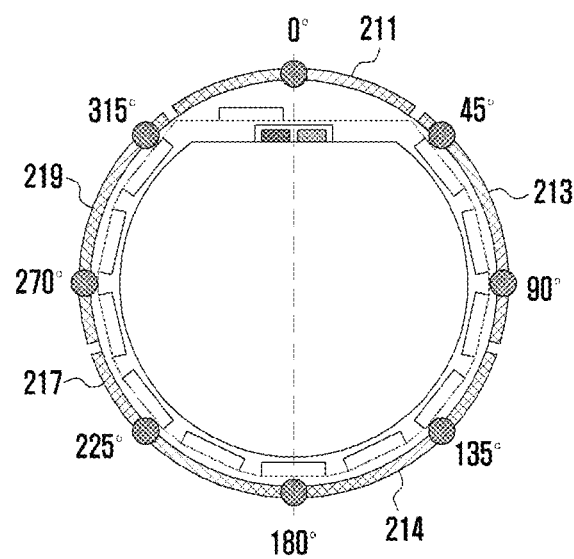
FIG. 6 is a diagram illustrating an example in which a wearing reference angle is determined in connection with a wearable device according to various embodiments.
Figure 6:
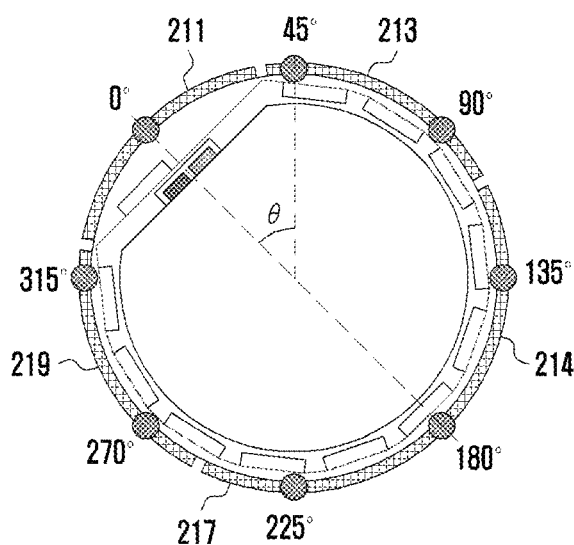

FIG. 6 is a diagram illustrating an example in which a wearing reference angle is determined in connection with a wearable device according to various embodiments.

Referring to FIG. 6, the wearable device according to various embodiments (for example, the wearable device 201 in FIG. 2) may include multiple touch interfaces 211, 213, 214, 217, 219 corresponding to multiple regions, may map corresponding angles to touch sensing ranges (or touch regions) of respective touch interfaces, and may store the same in the memory (for example, the memory 245 in FIG. 2). The multiple regions may be distinguished in the circumferential direction along at least one lateral surface of the outer perimeter (for example, the outer perimeter 301 in FIG. 3B) of the housing (for example, the housing 305 in FIG. 3B). The wearable device 201 may determine an angle according to a touch sensing range, based on the position in which a touch interface is disposed. For example, the memory 245 may store angles corresponding to touch sensing ranges of respective touch interfaces with reference to a state in which the wearable device 201 is correctly worn on the user's finger, as in the first wearing state 610.

Referring to the first wearing state 610, the first touch interface 211 may have an angle of 324°-36° corresponding to the touch sensing range thereof, the second touch interface 213 may have an angle of 36°-108° corresponding to the touch sensing range thereof, the third touch interface 214 may have an angle of 108°-180° corresponding to the touch sensing range thereof, the fourth touch interface 217 may have an angle of 180°-252° corresponding to the touch sensing range thereof, and the fifth touch interface 219 may have an angle of 252°-324° corresponding to the touch sensing range thereof. This is only an example for helping understanding of the disclosure, and the disclosure is not limited by the example. Touch sensing ranges of respective touch interfaces may overlap partially (for example, 5°), or touch interfaces may be disposed such that touch sensing ranges to not overlap each other.

The wearable device 201 may determine, based on touch information, that the user's wearing state is a second wearing state 630. The wearable device 201 may change the wearing reference angle upon confirming the second wearing state 630. For example, if the wearing reference angle has been determined in the first wearing state 610 with reference to the position in which the first touch interface 211 is disposed, the wearing reference angle may be determined with reference to the second touch interface 213 in the second wearing state 630. The wearable device 201 may confirm, based on touch information detected in the second wearing state 630, a state of rotation of about 45° (θ) from the reference angle. The wearable device 201 may determine that the wearing reference angle is an angle of rotation of about 45° (θ) from an angle stored in the memory 245. The wearable device 201 may correct the sensor axis of the inertial sensor 215 to be rotated about 45°, based on the wearing reference angle.

Figure 7:
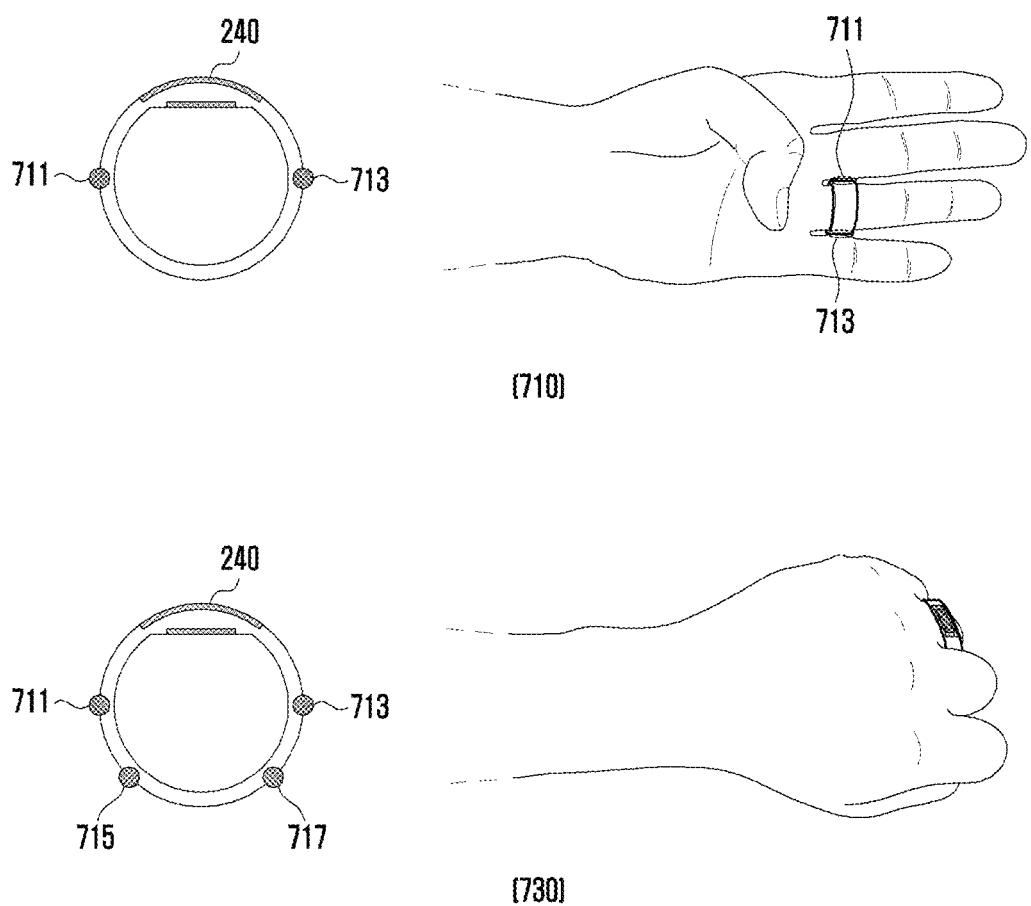
FIG. 7 is a diagram illustrating example in which a wearing reference angle is determined in connection with a wearable device according to various embodiments.

FIG. 7 is a diagram illustrating an example in which a wearing reference angle is determined in connection with a wearable device according to various embodiments.

Referring to FIG. 7, the wearable device according to various embodiments (for example, the wearable device 201 in FIG. 2) may assess the user's finger folding state, based on touch information acquired from at least one of multiple touch interfaces 211-219. For example, if the user is wearing the wearable device 201 on the left ring filter in the first wearing state 710, first touch information 711 and second touch information 713 may be detected. In the first wearing state 710, the output module 240 of the wearable device 201 may be disposed on a finger near the back of the hand of the user (for example, on the outside of the finger). If the user unfolds the finger after wearing the wearable device 201, the wearable device 201 may acquire first touch information 711 from the second touch interface 213, and may acquire second touch information 713 from the fifth touch interface 219. The wearable device 201 may confirm that the user has unfolded the finger after wearing the wearable device 201, based on the first touch information 711 and the second touch information 713.

When the user wears the wearable device 201 on the left ring finger in the second wearing state 730, first touch information 711, second touch information 713, third touch information 715, and fourth touch information 717 may be detected. If the user has clenched his/her fist while wearing the wearable device 201, the wearable device 201 may acquire first touch information 711 by means of the second touch interface 213, may acquire fourth touch information 717 by means of the third touch interface 214, may acquire third touch information 715 by means of the fourth touch interface 217, and may acquire second touch information 713 by means of the fifth touch interface 219. The wearable device 201 may confirm that the user has clenched his/her fist while wearing the wearable device 201, based on the first touch information 711, the second touch information 713, the third touch information 715, and the fourth touch information 717.

The wearable device 201 may determine a wearing reference angle, based on touch information, and may correct the sensor axis of the inertial sensor 215, based on the wearing reference angle. The wearable device 201 may calculate posture information from sensing information measured by the inertial sensor 215, based on the corrected sensor axis. According to various embodiments, the wearable device 201 may distinguish a one-hand touch, a pick-up touch using the thumb and the forefinger, or a squeeze touch, based on touch information, in the first wearing state 710.

According to various embodiments, the wearable device 201 may combine pieces of sensing information acquired from the touch sensor 210, the inertial sensor 215, and the biometric sensor 220, respectively, thereby preventing and/or reducing erroneous recognition of a motion gesture, or assessing the user's state. For example, when the amount of change in posture information is calculated together with touch information, the wearable device 201 may distinguish a rotation generated by a wrist rotation occurring in daily life. Alternatively, touch information and posture information may be combined to execute functions corresponding to various motion gestures. For example, if the electronic device (for example, the electronic device 101 in FIG. 1) and the wearable device 201 are connected (for example, in a first network state 410), and if the wearable device 201 is double-touched and then rotated in a first direction (for example, rotated upwards), the electronic device 101 may receive a call. Alternatively, if the wearable device 201 is double-touched and then rotated in a second direction (for example, rotated downwards), the electronic device 101 may refuse to receive a call.

In an embodiment, if the amount of change in posture information is detected, and if a change in flow rate of blood in a finger id detected according to the temperature of water, based on biometric information acquired from the biometric information 220, the wearable device 201 confirm a hand-washing state.

Alternatively, when the wearable device 201 further includes a temperature sensor or a humidity sensor, a hand-washing state may be confirmed if a temperature lower or higher than the user's body temperature (for example, 36.5°) is detected. The wearable device 201 may measure a change in capacitance occurring when water used to wash hands touches the output module 240, as well as posture information, thereby improving the accuracy of the hand-washing motion.

Figure 8:
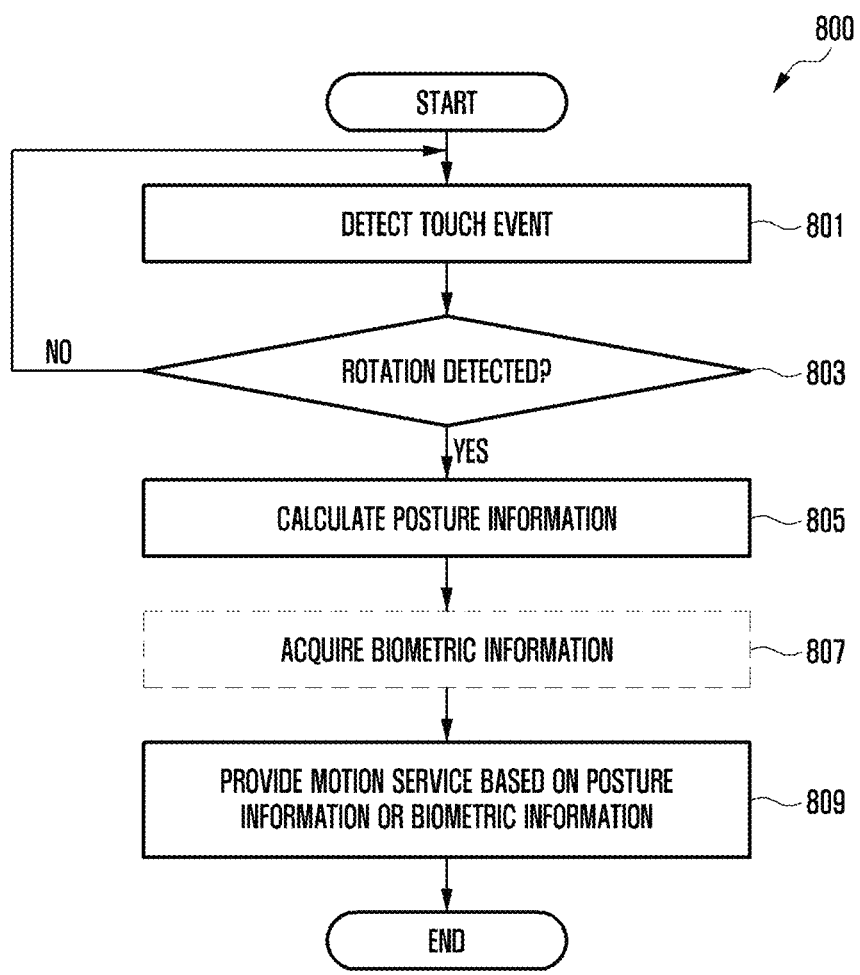
FIG. 8 is a flowchart illustrating an example method for providing a motion service by a wearable device according to various embodiments.

FIG. 8 is a flowchart 800 illustrating an example method for providing a motion service by a wearable device according to various embodiments.

Referring to FIG. 8, in operation 801, the processor (for example, the processor 230 in FIG. 2) of the wearable device according to various embodiments (for example, the wearable device 201 in FIG. 2) may detect a touch event (or touch information). The touch event may be used to assess the user's intent. When a function corresponding to a motion gesture is executed, a function unintended by the user may be executed. The processor 230 may determine that only a rotation detected after a touch event has occurred is a valid input. The processor 230 may detect touch information acquired from a touch sensor (for example, the touch sensor 210 in FIG. 2) as a touch event. The touch event may include a preconfigured touch, for example, a one-hand touch, a pick-up touch, or a squeeze touch.

In operation 803, the processor 230 may determine whether a rotation is detected. The rotation may be detected by means of sensing information detected from an inertial sensor (for example, the inertial sensor 215 in FIG. 2). The processor 230 may determine that a rotation has been detected, if there is an amount of change in sensing information detected from the inertial sensor 215. The processor 230 may perform operation 805 if a rotation is detected, and may return to operation 801 if no rotation is detected.

In operation 805, the processor 230 may calculate posture information. The processor 230 may calculate posture information, based on sensing information acquired from the inertial sensor 215. The processor 230 may determine a wearing reference angle while or before calculating posture information, may correct the sensor axis of the inertial sensor 215 based on the determined wearing reference angle, and may calculate posture information based on the acquired posture information. The processor 230 may calculate posture information by applying the acquired sensing information to Equations 2 to 4.

In operation 807, the processor 230 may acquire biometric information from a biometric sensor (for example, the biometric sensor 220 in FIG. 2). The biometric information may include at least one of a blood pressure value, ECG, GSR, EEG, BIA, or BCG. The processor 230 may store the biometric information in a memory (for example, the memory 245 in FIG. 2). The processor 230 may determine that the user's state is one of sleep, exercise, work, or rest, based on the biometric information. If no biometric information is necessary for a motion service, operation 807 may be omitted.

According to various embodiments, the processor 230 may provide a notification (for example, a warning sound) according to the user's state, based on biometric information. For example, if sleep termination is detected based on biometric information, the processor 230 may notify of sleep termination, of if two hours of consecutive work (without resting) are detected, a rest notification may be provided.

In operation 809, the processor 230 may provide a motion service, based on posture information or biometric information. The processor 230 may transmit the posture information or biometric information to an electronic device (for example, the electronic device 101 in FIG. 1) connected through a communication module (for example, the communication module 225 in FIG. 2). For example, if the electronic device 101 and the wearable device 201 are connected (for example, in a first network state 410), and if the wearable device 201 is double-touched and then rotated in a first direction (for example, rotated upwards), the processor 230 may cause the electronic device 101 to receive a call. Alternatively, if the wearable device 201 is double-touched and then rotated in a second direction (for example, rotated downwards), the electronic device 101 may refuse to receive a call.

Figure 9:
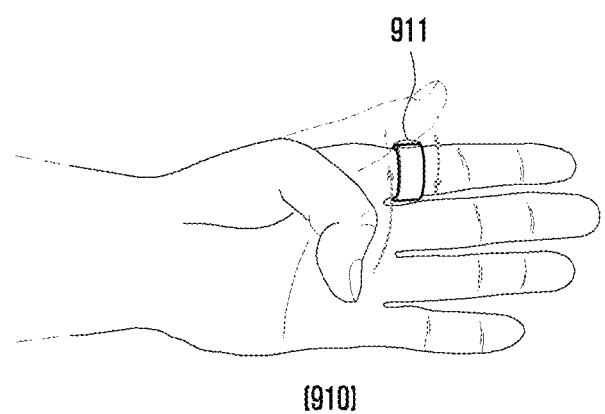
FIG. 9 is a diagram illustrating an example in which a motion service is provided by a wearable device according to various embodiments.
Figure 9:
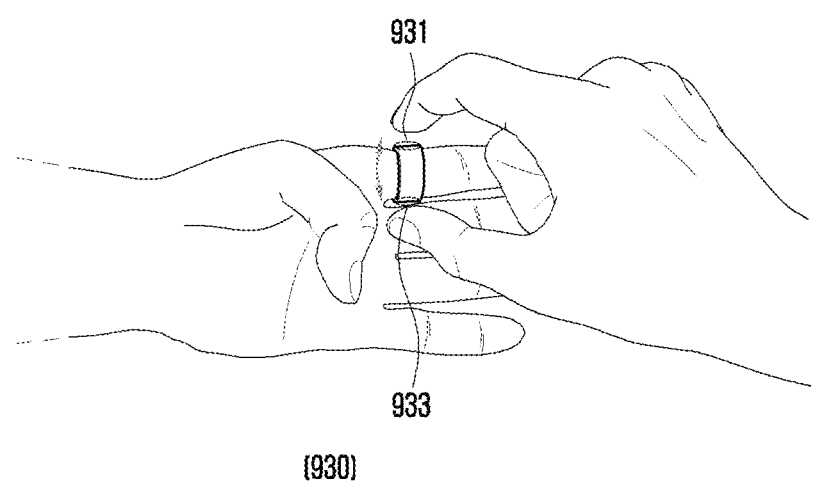

FIG. 9 is a diagram illustrating an example in which a motion service is provided by a wearable device according to various embodiments.

Referring to FIG. 9, the wearable device according to various embodiments (for example, the wearable device 201 in FIG. 2) may provide a first motion service 910 or a second motion service 930. For example, the first motion service 910 may correspond to case in which, if an electronic device (for example, the electronic device 101 in FIG. 1) and the wearable device 201 are connected (for example, in a first network state 410), and if the wearable device 201 is touched by one hand (911) and then rotated, the volume of the electronic device 101 is adjusted. The second motion service 930 may correspond to case in which, if the electronic device 101 and the wearable device 201 are connected, and if the wearable device 201 is touched by two fingers (931 and 933) and then rotated, an incoming call to the electronic device 101 is received.

Figure 10A:
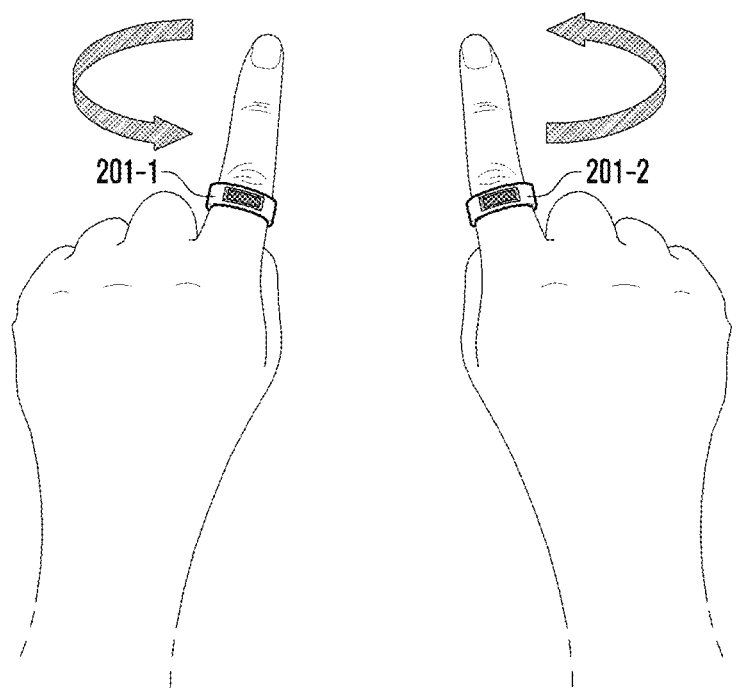
FIGS. 10A and 10B are diagrams illustrating an example in which a motion service is provided by a wearable device according to various embodiments.
Figure 10B:
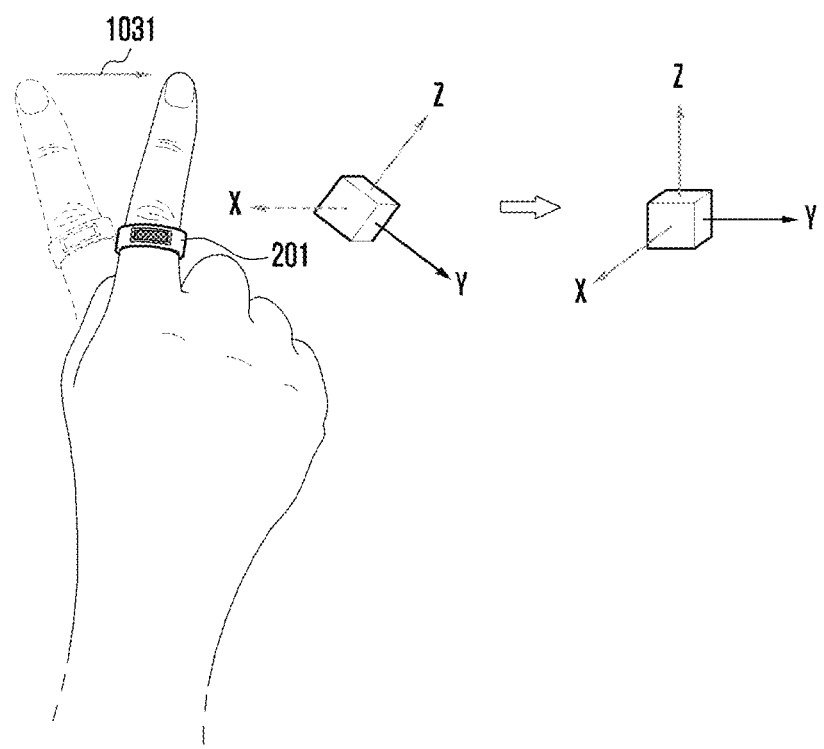

FIGS. 10A and 10B are diagrams illustrating an example in which a motion service is provided by a wearable device according to various embodiments.

Referring to FIG. 10A, the wearable device according to various embodiments (for example, the wearable device 201 in FIG. 2) may provide a first motion service 1010. For example, the first motion service 1010 may correspond to a case in which, if one wearable device 201-1 is rotated counterclockwise, and if another wearable device 201-2 is rotated counterclockwise successively or simultaneously, zoom in or zoom output is performed through two-hand control. For example, the user's state may be erroneously assessed solely with a motion gesture detected by one wearable device 201-1. If the user is wearing two wearable devices 201-1 and 201-2, amount-of-rotation information (for example, posture information) generated in the two wearable devices 201-1 and 201-2 is used when recognizing a motion gesture related to a rotation, thereby reducing the occurrence of erroneous recognition occurring in daily life. If it is difficult to distinguish an operation or to assess a motion gesture solely with one wearable device 201-1, two wearable devices 201-1 and 201-2 may be used according to the disclosure, thereby providing a more accurate motion service.

According to various embodiments, if the user who is wearing two wearable devices 201-1 and 201-2 moves his/her hand upwards/downwards/forwards/backwards, the two wearable devices 201-1 and 201-2 may confirm a horizontal movement or a rotational movement and may determine that the user is performing an operation such as handwashing.

Referring to FIG. 10B, the wearable device 201 may provide a second motion service 1030. The second motion service 1030 may correspond to case in which, if an electronic device (for example, the electronic device 101 in FIG. 1) and the wearable device 201 are connected (for example, in a first network state 410), and if the wearable device 201 is touched by one hand and then rotated (1031), the incoming call to the electronic device 101 is rejected. The wearable device 201 may correct the sensor axis of the inertial sensor 215, may calculate posture information based on the corrected sensor axis, and may transmit the calculated posture information to the electronic device 101. The electronic device 101 may reject the call if the amount of change in posture information corresponds to a motion gesture related to call rejection FIG. 11 is a flowchart 1100 illustrating an example method for controlling at least one wearable device by an electronic device according to various embodiments.

Figure 11:
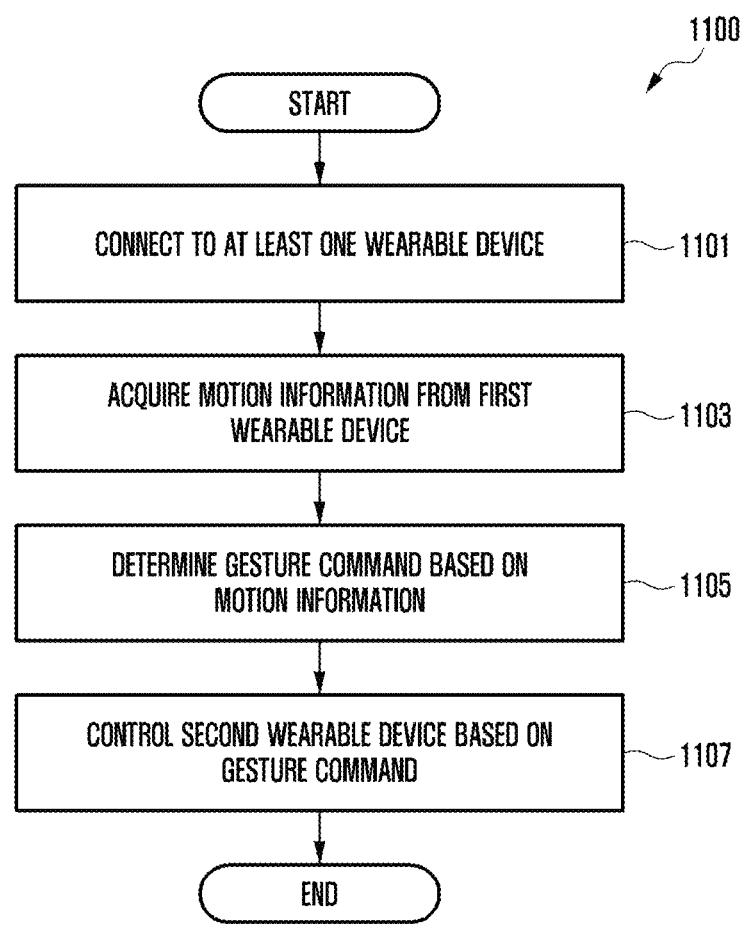
FIG. 11 is a flowchart illustrating an example method for controlling at least one wearable device by an electronic device according to various embodiments.

Referring to FIG. 11, in operation 1101, the processor (for example, the processor 120 in FIG. 2) of the electronic device according to various embodiments (for example, the electronic device 101 in FIG. 1) may be connected to at least one wearable device through a communication module (for example, the communication module 190 in FIG. 1). The at least one wearable device may include a ring-type wearable device (for example, the wearable device 201 in FIG. 2) and a glass-type wearable device (for example, the wearable device 207 in FIG. 4B). Since two wearable devices exist in FIG. 11, the ring-type wearable device 201 may be identified as a first wearable device 201, and the glass-type wearable device 207 may be identified as a second wearable device 207.

According to various embodiments, connection of the electronic device 101 to the first wearable device 201 and the second wearable device 207 may correspond to a second network environment (for example, the second network environment 430 in FIG. 4B). The electronic device 101 may be connected to the first wearable device 201 and the second wearable device 207 in a short-range communication type. For example, the electronic device 101 may be connected to the first wearable device 201 and the second wearable device 207 through Bluetooth.

According to various embodiments, the electronic device 101 may be initially connected to the first wearable device 201 or the second wearable device 207 through Bluetooth communication, and the communication type may be automatically changed to Wi-Fi Direct if large-capacity transmission is necessary. Alternatively, the electronic device 101 may be connected to the first wearable device 201 or the second wearable device 207 through UWB, thereby measuring the distance from the first wearable device 201 or the distance from the second wearable device 207.

In operation 1103, the processor 120 may acquire motion information (or posture information) from the first wearable device 201. If the first wearable device 201 receives sensing data (raw sensor data), the transmission band may increase, or a power consumption issue may occur. The processor 120 may receive motion information calculated (or assessed) based on sensing information sensed by the first wearable device 201. The motion information may include a direction of rotation (for example, clockwise, counterclockwise) or a rotational speed. For example, the first wearable device 201 may transmit motion information including a calculated value, which is not raw sensor data, to the electronic device 101 at 16 ms (60 Hz). The first wearable device 201 may transmit motion information determined by summating or averaging various pieces of data or by considering a deviation, in order to sense information at a higher rate therein and to reduce errors. The processor 120 may receive motion information from the first wearable device 201 periodically, in real time, or selectively.

In operation 1105, the processor 120 may determine a gesture command in response to (e.g., based on) motion information. The processor 120 may store the motion information, may determine a gesture command corresponding to the motion information, and may transmit the same to the second wearable device 207. For example, the processor 120 may transmit the motion information to the second wearable device 207 in a relay format, or may process and transmit the motion information. For example, assuming that motion information comes in at a rotational direction or rotational speed of 60 Hz, the processor 120 may determine whether to adjust (for example, increase or decrease) the volume size by one step if the rotation value is accumulated to some extent, based on a volume size adjustment step (for example, minimum value-maximum value), so as to conform to optimal user experience.

In operation 1107, the processor 120 may control the second wearable device 207 based on a gesture command According to various embodiments, the processor 120 may control the speaker volume according to a volume value (for example, 0-100) matched by calculating the degree of accumulated rotation, based on the motion information, may simultaneously generate a volume control command to be displayed as a user interface, and may transmit the same to the second wearable device 207. For example, if the rotational direction included in the motion information is detected as exceeding the degree of rotation (for example, one-step volume value) configured in the upward direction (or clockwise direction), the processor 120 may transmit a volume-up command to the second wearable device 207 such that the volume of the second wearable device 207 is increased. If the rotational direction included in the motion information is detected as exceeding the degree of rotation configured in the downward direction (or counterclockwise direction), the processor 120 may transmit a volume-down command to the second wearable device 207 such that the volume of the second wearable device 207 is decreased.

According to various embodiments, if the first wearable device 201 is included in the gaze of the user who is wearing the second wearable device 207, the second wearable device 207 may display a user interface related to the volume control (for example, volume up, volume down), based on the position of the first wearable device 201 included in the user's gaze. For example, the second wearable device 207 may display a user interface related to the volume control so as to be close to the first wearable device 201 included in the user's gaze.

According to various embodiments, the first wearable device 201 and the second wearable device 207 may be connected to each other (for example, the third network environment 450 in FIG. 4C). For example, the first wearable device 201 and the second wearable device 207 may be connected in at least one communication type among Bluetooth, Wi-Fi Direct, and UWB. Although it is assumed in the above description that the electronic device 101 controls the second wearable device 207 with a gesture command, the second wearable device 207 may directly acquire motion information from the first wearable device 201 and then perform a gesture command corresponding to the motion information, or may display a user interface corresponding to the gesture command.

Figure 12A:
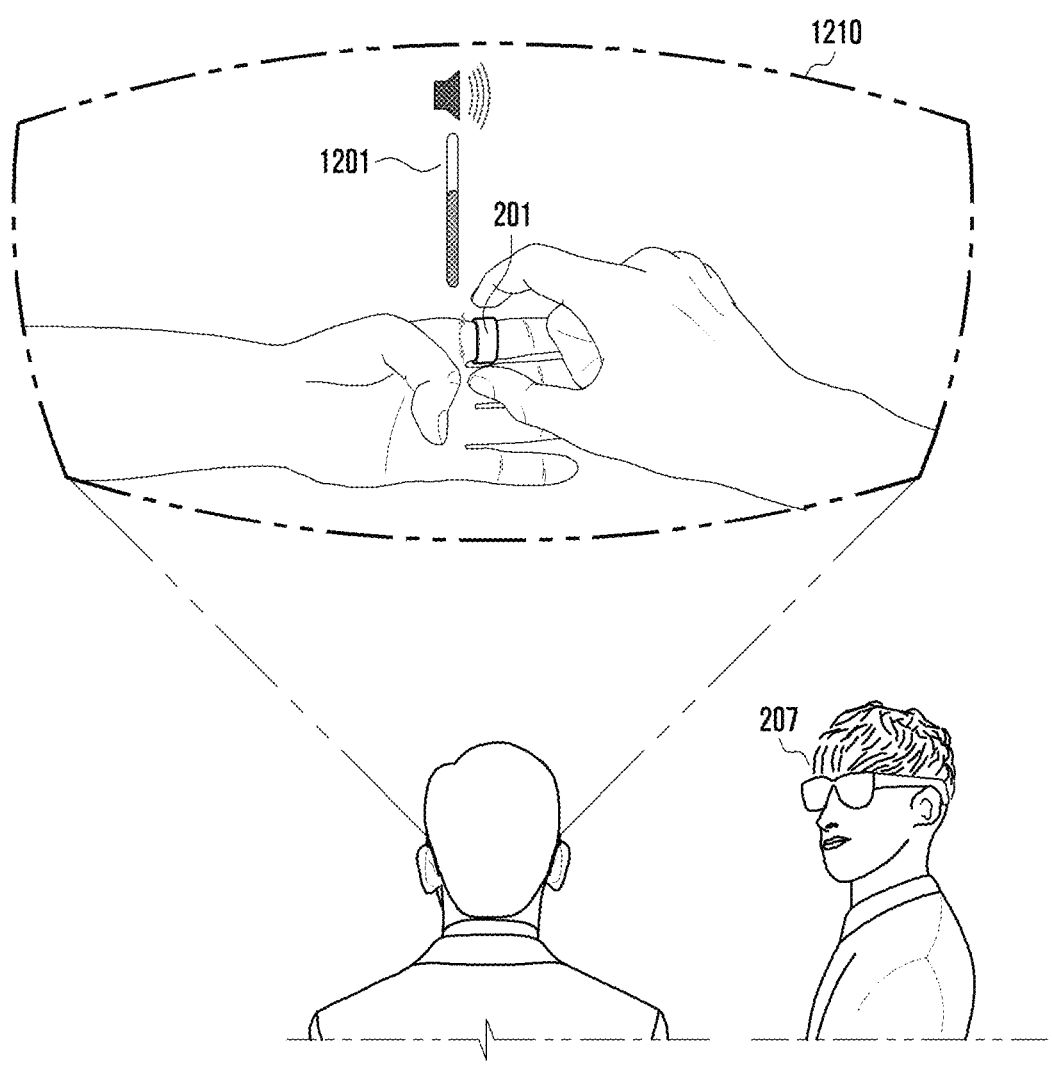
FIGS. 12A and 12B are diagrams illustrating an example in which at least one wearable device is controlled by an electronic device according to various embodiments.
Figure 12B:
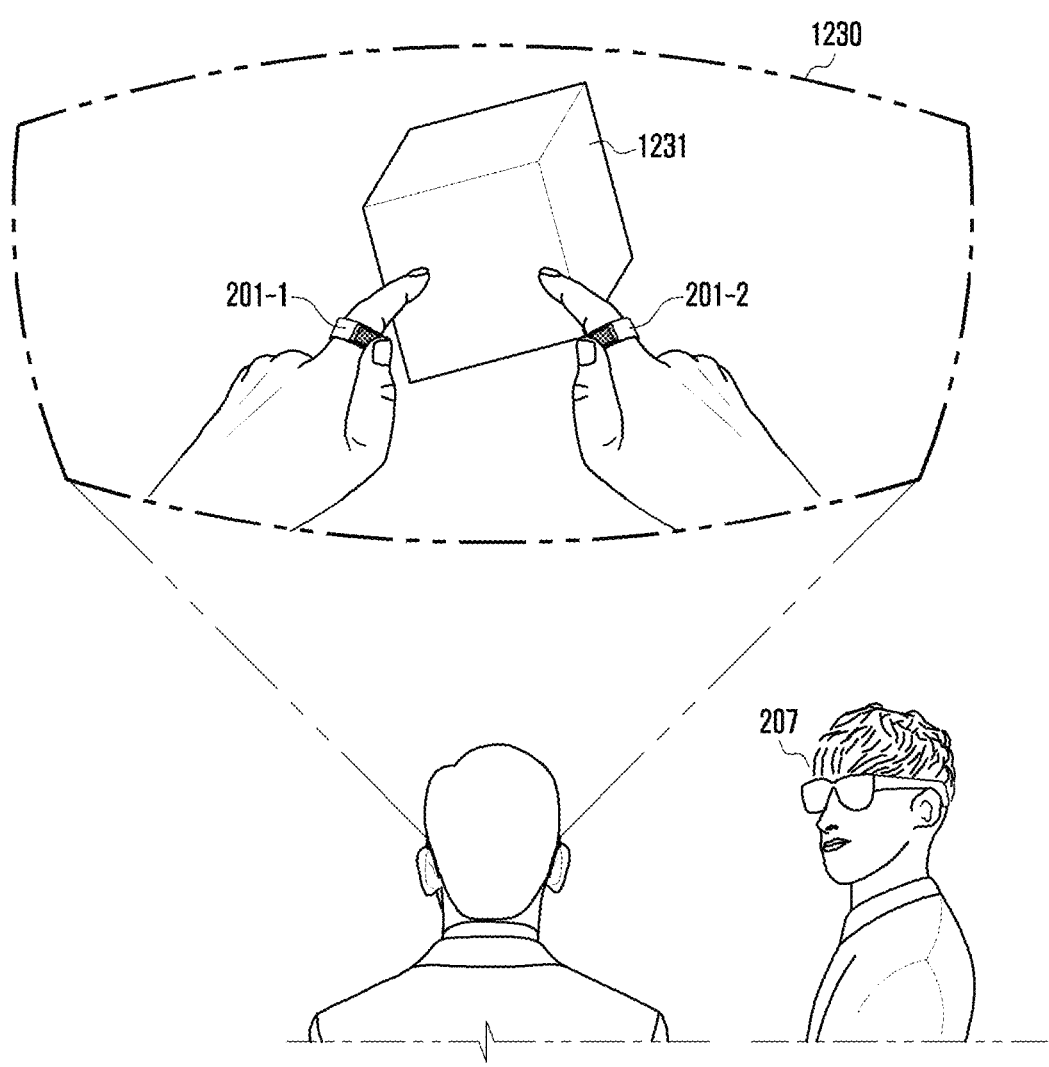

FIGS. 12A and 12B are diagrams illustrating an example in which at least one wearable device is controlled by an electronic device according to various embodiments.

Referring to FIG. 12A, the electronic device according to various embodiments (for example, the electronic device 101 in FIG. 1) may be connected to at least one wearable device through a communication module (for example, the communication module 190 in FIG. 1). The at least one wearable device may include a ring-type wearable device (for example, the wearable device 201 in FIG. 2) and a glass-type wearable device (for example, the wearable device 207 in FIG. 4B). since two wearable devices exist in FIG. 10A, the ring-type wearable device 201 may be identified as a first wearable device 201, and the glass-type wearable device 207 may be identified as a second wearable device 207.

The electronic device 101 may acquire sensing information from the first wearable device 201. The electronic device 101 may calculate the amount of change of the sensing information acquired from the first wearable device 201. For example, if the user who is wearing the first wearable device 201 on his/her left finger makes a gesture of holding and rotating the first wearable device 201 with two fingers of his/her right hand, the electronic device 101 may control the volume of a video output (or displayed) through the second wearable device 207 to be adjusted. The electronic device 101 may transmit a volume control command to the second wearable device 207 through a communication module 190. The second wearable device 207 may display a user interface 1210 corresponding to the volume control command. The user interface 1210 is displayed on the display of the second wearable device 207 based on the gaze of the user who is wearing the second wearable device 207, and may include graphic data 1201 related to volume control, for example. The second wearable device 207 may identify the first wearable device 201 through object recognition, and may control the graphic data 1201 to be output based on the position of the first wearable device 201.

Although the volume is given as an example in the drawing, the electronic device 101 may control the brightness of the second wearable device 207 based on motion information of the first wearable device 201. Alternatively, the electronic device 101 may be connected to a third wearable device (not illustrated) (for example, a wireless audio output device) which outputs the volume of a video output (or displayed) through the second wearable device 207, and may transmit a volume control command to the third wearable device. For example, the second wearable device 207 may display a user interface corresponding to the volume control command, and the third wearable device may adjust the volume in response to the volume control command.

Referring to FIG. 12B, the electronic device 101 may be connected to a first wearable device 201-1, a second wearable device 207, and a third wearable device 201-2 through a communication module (for example, the communication module 190 in FIG. 1). The first wearable device 201-1 and the third wearable device 201-2 may be ring-type wearable devices. The electronic device 101 may acquire sensing information from each of the first wearable device 201-1 and the third wearable device 201-2. If the electronic device 101 detects a motion gesture of the user who is wearing the first wearable device 201-1 and the third wearable device 201-2, made by holding and rotating an object 1231 by his/her finger, the electronic device 101 may control the second wearable device 207 such that the object 1231 displayed on the second wearable device 207 is rotated.

The electronic device 101 may transmit an object 1231 rotating command (for example, three-dimensional rotation) to the second wearable device 207 through the communication module 190. The second wearable device 207 may display a user interface 1230 which displays the object 1231. The user interface 1230 may include the object 1231 as graphic data, and may rotate and display the object 1231 according to the rotating command. The user interface 1230 is displayed on the display of the second wearable device 207 based on the gaze of the user who is wearing the second wearable device 207, and may include the object 1231, for example, as graphic data.

According to various embodiments, picking the object 1231 may be distinguished using touch information of the first wearable device 201-1 and the third wearable device 201-2, and the rotational direction of the object 1231 may be determined using posture information of the first wearable device 201-1 and the third wearable device 201-2. If the first wearable device 201-1 and the third wearable device 201-2 move in opposite directions, the size of the object 1231 may be increased or decreased using the movements of the first wearable device 201-1 and the third wearable device 201-2 away from or toward each other.

According to various embodiments, the object 1231 rotating command may be made by correcting the sensor axis of the inertial sensor (for example, the inertial sensor 215 in FIG. 2) according to touch information in each of the first wearable device 201-1 and the third wearable device 201-2, and based on a motion gesture corresponding to posture information calculated based on the corrected sensor axis. In order to control a rotating command using a directional motion gesture, the same needs to be controlled upwards/downwards/leftwards/rightwards through posture information, and the reference point of the sensor axis of the inertial sensor 215 needs to be retained during the upward/downward/leftward/rightward control such that upward/downward/leftward/rightward values do not deviate.

A method for operating a wearable device (for example, the wearable device 201 in FIG. 2) including a touch sensor (for example, the touch sensor 210 in FIG. 2) including multiple region-specific touch interfaces (for example, the first touch interface 211 to the fifth touch interface 219 in FIG. 3B), a biometric sensor (for example, the biometric sensor 220 in FIG. 2), and an inertial sensor (for example, the inertial sensor 215 in FIG. 2) having a configured sensor axis according to an example embodiment may include: detecting whether the wearable device is worn using the biometric sensor and/or the inertial sensor, receiving touch information from at least one of the multiple touch interfaces included in the touch sensor, correcting the sensor axis of the inertial sensor based on the touch information, acquiring sensing information from the inertial sensor, and calculating posture information from the sensing information based on the corrected sensor axis.

The correcting operation may include an operation of determining a wearing reference angle based on the touch information, and correcting the sensor axis of the inertial sensor based on the wearing reference angle.

The determining the wearing reference angle may include determining the wearing reference angle as an angle stored in the memory based on the wearable device wearing state being a first wearing state based on the touch information, or changing the wearing reference angle based on the wearable device wearing state being a second wearing state based on the touch information.

The method may further include the biometric sensor formed on a housing inner perimeter of the ring-type wearable device contacting a user's body and to acquire biometric information when the wearable device is worn.

The method may further include assessing the user's wearing state based on the wearable device being worn using multiple touch interfaces formed on a housing outer perimeter of the ring-type wearable device.

The method may further include: connecting to an electronic device through the communication module of the wearable device, and transmitting the touch information or the posture information to the electronic device such that a function of the electronic device is executed based on the touch information or the posture information.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable device comprising:
   a touch sensor disposed within a specified proximity to an outside of a housing, the touch sensor comprising multiple region-specific touch interfaces;
   an inertial sensor having a configured sensor axis;
   a biometric sensor disposed within a specified proximity to an inside of the housing;
   a communication module comprising communication circuitry;
   a memory configured to store angles mapped to correspond to touch detection ranges of respective touch interfaces of the touch sensor; and
   a processor operatively connected to the touch sensor, the inertial sensor, the biometric sensor, the communication module, and the memory,
   wherein the processor is configured to:
   detect whether the wearable device is worn using the biometric sensor and/or the inertial sensor;
   receive touch information from at least one of the multiple touch interfaces included in the touch sensor;
   correct the sensor axis of the inertial sensor based on the touch information,
   acquire sensing information from the inertial sensor; and
   calculate posture information from the sensing information based on the corrected sensor axis.

2. The wearable device of claim 1, wherein the processor is configured to determine that the wearable device is worn based on biometric information being acquired from the biometric sensor, or a movement being detected from the inertial sensor.

3. The wearable device of claim 1, wherein the processor is configured to:
   determine a wearing reference angle based on the touch information; and
   correct the sensor axis of the inertial sensor based on the wearing reference angle.

4. The wearable device of claim 3, wherein the processor is configured to:
   determine the wearing reference angle as an angle stored in the memory based on the wearable device wearing state being a first wearing state based on the touch information; and
   change the wearing reference angle based on the wearable device wearing state being a second wearing state based on the touch information.

5. The wearable device of claim 1, wherein multiple touch interfaces included in the touch sensor are disposed such that touch detection ranges of respective touch interfaces do not overlap.

6. The wearable device of claim 1, wherein the wearable device is a ring type, and
   wherein the multiple touch interfaces are disposed in a circumferential direction along at least one lateral surface of a ring-type housing outer perimeter.

7. The wearable device of claim 6, wherein the biometric sensor is disposed on a ring-type housing inner perimeter to contact a user's body and to acquire biometric information based on the wearable device being worn, and
   wherein the multiple touch interfaces are disposed on a ring-type housing outer perimeter and configured to acquire the user's wearing state based on the wearable device being worn.

8. The wearable device of claim 1, wherein the processor is configured to determine a motion gesture based on at least one of touch information acquired by each of the touch interfaces, sensing information acquired by the inertial sensor, or biometric information acquired by the biometric sensor.

9. The wearable device of claim 1, wherein the processor is configured to:
   connect to an electronic device through the communication module; and
   transmit the touch information or the posture information to the electronic device such that a function of the electronic device is executed based on the touch information or the posture information.

10. The wearable device of claim 1, wherein the processor is configured to assess a user's intent based on touch information acquired by each of the touch interfaces before rotation detection.

11. A method for operating a wearable device comprising a touch sensor comprising multiple region-specific touch interfaces, a biometric sensor, and an inertial sensor having a configured sensor axis, the method comprising:
   detecting whether the wearable device is worn using the biometric sensor or the inertial sensor;
   receiving touch information from at least one of the multiple touch interfaces included in the touch sensor;
   correcting the sensor axis of the inertial sensor based on the touch information;
   acquiring sensing information from the inertial sensor; and calculating posture information from the sensing information based on the corrected sensor axis.

12. The method of claim 11, wherein the correcting comprises determining a wearing reference angle based on the touch information, and correcting the sensor axis of the inertial sensor based on the wearing reference angle.

13. The method of claim 11, wherein the determining the wearing reference angle comprises
   determining the wearing reference angle as an angle stored in the memory based on the wearable device wearing state being a first wearing state based on the touch information, or
   changing the wearing reference angle based on the wearable device wearing state being a second wearing state based on the touch information.

14. The method of claim 11, further comprises the biometric sensor formed on a housing inner perimeter of the ring-type wearable device contacting a user's body and to acquire biometric information when the wearable device is worn.

15. The method of claim 11, further comprises assessing the user's wearing state based on the wearable device being worn using multiple touch interfaces formed on a housing outer perimeter of the ring-type wearable device.

16. The method of claim 11, further comprises connecting to an electronic device through a communication module of the wearable device, and transmitting the touch information or the posture information to the electronic device such that a function of the electronic device is executed based on the touch information or the posture information.

* * * * *